United States Patent
Ikeda et al.

(10) Patent No.: US 7,979,327 B2
(45) Date of Patent: Jul. 12, 2011

(54) CONSTANT VELOCITY UNIVERSAL JOINT AND QUALITY CONTROL METHOD FOR THE SAME

(75) Inventors: Takeshi Ikeda, Iwata (JP); Hideki Kondou, Iwata (JP)

(73) Assignee: NTN Corporation, Osaka (JP)

( * ) Notice: Subject to any disclaimer, the term of this patent is extended or adjusted under 35 U.S.C. 154(b) by 1056 days.

(21) Appl. No.: 11/658,954

(22) PCT Filed: Jul. 25, 2005

(86) PCT No.: PCT/JP2005/013558
§ 371 (c)(1),
(2), (4) Date: Jan. 30, 2007

(87) PCT Pub. No.: WO2006/011439
PCT Pub. Date: Feb. 2, 2006

(65) Prior Publication Data
US 2009/0216360 A1    Aug. 27, 2009

(30) Foreign Application Priority Data

Jul. 30, 2004 (JP) ................. 2004-223746
Jul. 30, 2004 (JP) ................. 2004-223747
Jul. 30, 2004 (JP) ................. 2004-223748

(51) Int. Cl.
*G06Q 10/00* (2006.01)
*B60Q 1/00* (2006.01)
*G08B 13/14* (2006.01)
*F16D 3/00* (2006.01)

(52) U.S. Cl. ....... 705/28; 340/438; 340/572.1; 464/143; 464/145

(58) Field of Classification Search ............ 705/28
See application file for complete search history.

(56) References Cited

U.S. PATENT DOCUMENTS 6,321,983 B1    11/2001  Katayanagi et al.
6,780,114 B2 *   8/2004  Sahashi et al. ............ 464/146
(Continued)

FOREIGN PATENT DOCUMENTS
JP    63-60011    3/1988
(Continued)

OTHER PUBLICATIONS

International Search Report for PCT/JP2005/013558 mailed Sep. 20, 2005 (2 pages).
(Continued)

Primary Examiner — F. Ryan Zeender
Assistant Examiner — Paul Danneman
(74) Attorney, Agent, or Firm — Osha • Liang LLP

(57) ABSTRACT

A quality control method for a constant velocity universal joint 13 includes a step of attaching an IC tag 9 to the constant velocity universal joint 13, a step of recording information in the IC tag 9 about the constant velocity universal joint 13, a utilizing step for reading the information recorded in the IC tag 9 at any arbitrarily chosen time. The IC tag 9 is attached to one of elements 2 such as an outer race 14, an inner race 15, an intermediate shaft 12 and boots 18, all forming respective parts of the constant velocity universal joint 13. This IC tag 9 is recorded with information on, for example, the manufacturing step, the identification number, the date of manufacture and/or the place of manufacture with respect to the elements 2 and the constant velocity universal joint 13.

30 Claims, 18 Drawing Sheets

U.S. PATENT DOCUMENTS

| | | | |
|---|---|---|---|
| 6,898,489 B1* | 5/2005 | Hayes, Sr. | 701/1 |
| 7,042,346 B2* | 5/2006 | Paulsen | 340/438 |
| 7,094,155 B2* | 8/2006 | Hosoya et al. | 464/145 |
| 7,471,198 B2* | 12/2008 | Yamamoto et al. | 340/572.1 |
| 7,525,430 B2* | 4/2009 | Nakamura et al. | 340/572.1 |
| 2001/0016520 A1 | 8/2001 | Sahashi et al. | |
| 2002/0186134 A1* | 12/2002 | Rehfus et al. | 340/572.8 |
| 2003/0042316 A1 | 3/2003 | Teraura | |
| 2003/0042690 A1 | 3/2003 | Oki et al. | |
| 2005/0071032 A1 | 3/2005 | Urabe | |

FOREIGN PATENT DOCUMENTS

| | | |
|---|---|---|
| JP | 3-223523 | 10/1991 |
| JP | 11-85925 | 3/1999 |
| JP | 11-255224 | 9/1999 |
| JP | 11255224 A * | 9/1999 |
| JP | 2000-48066 | 2/2000 |
| JP | 2000-508459 | 7/2000 |
| JP | 2002-169858 | 6/2002 |
| JP | 2002169858 A * | 6/2002 |
| JP | 2002-536726 | 10/2002 |
| JP | 2003-74580 | 3/2003 |
| JP | 2003-150922 | 5/2003 |
| JP | 2003-186519 | 7/2003 |
| JP | 2003233652 A * | 8/2003 |
| JP | 2003-271216 | 9/2003 |
| JP | 2004-33257 | 2/2004 |
| WO | 98/25248 | 6/1998 |
| WO | WO 0045324 A2 * | 8/2000 |

OTHER PUBLICATIONS

Patent Abstracts of Japan 11-255224 dated Sep. 21, 1999 (2 pages).
Patent Abstracts of Japan 2003-233652 dated Aug. 22, 2003 (1 page).
Patent Abstracts of Japan 11-248035 dated Sep. 14, 1999 (1 page).
Patent Abstracts of Japan 2002-094300 dated Mar. 29, 2002 (1 page).
Patent Abstracts of Japan 2002-169858 dated Jun. 14, 2002 (1 page).
Patent Abstracts of Japan 2002-049900 dated Feb. 15, 2002 (2 pages).
Extended European Search Report in related patent application No. 05766282.7, dated Jun. 4, 2010, 6 pages.
Communication pursuant to Article 94(3)EPC from the EPO in related patent application No. 05766282.7, dated May 18, 2010, 5 pages.
Japanese Notification of Reasons for Rejections in related patent application No. 2004-223746, dated Jun. 1, 2010, and translation thereof, 6 pages.
Patent Abstracts of Japan for patent application with Publication No. 2003-271216, Publication Date: Sep. 26, 2003, 1 page.
Patent Abstracts of Japan for patent application with Publication No. 2003-186519, Publication Date: Jul. 4, 2003, 1 page.
Japanese Notification of Reasons for Rejections in related patent application No. 2004-223747, dated Jun. 1, 2010, and translation thereof, 4 pages.
Patent Abstracts of Japan for patent application with Publication No. 2000-048066, Publication Date: Feb. 18, 2000, 1 page.
Patent Abstracts of Japan for patent application with Publication No. 63-060011, Publication Date: Mar. 16, 1988, 1 page.
Patent Abstracts of Japan for patent application with Publication No. 2004-033257, Publication Date: Feb. 5, 2004, 1 page.
Patent Abstracts of Japan for patent application with Publication No. 2003-150922, Publication Date: May 23, 2003, 1 page.
Japanese Notification of Reasons for Rejections in related patent application No. 2004-223748, dated Jun. 1, 2010, and translation thereof, 4 pages.
Patent Abstracts of Japan for patent application with Publication No. 2003-074580, Publication Date: Mar. 12, 2003, 1 page.
Patent Abstracts of Japan for patent application with Publication No. 11-085925, Publication Date: Mar. 30 1999, 1 page.
Decision of Rejection for related Japanese Application No. 2004-223748, dated Oct. 5, 2010, and English translation thereof, 3 pages.
Decision of Rejection for related Japanese patent application No. 2004-223747, dated Oct. 12, 2010, and translation thereof, 4 pages.
Patent Abstracts of Japan for patent application with Publication No. 03-223523, Publication Date: Oct. 2, 1991, 1 page.

* cited by examiner

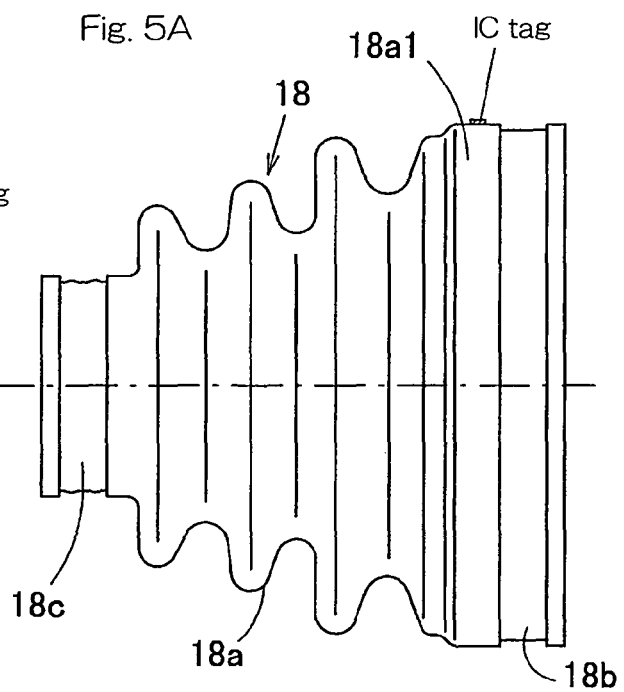
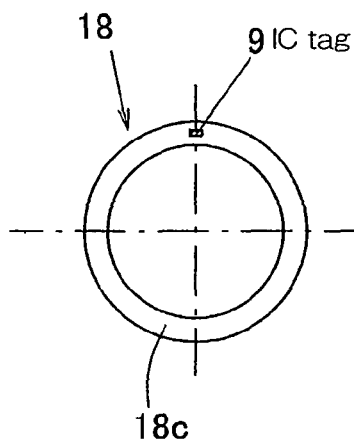
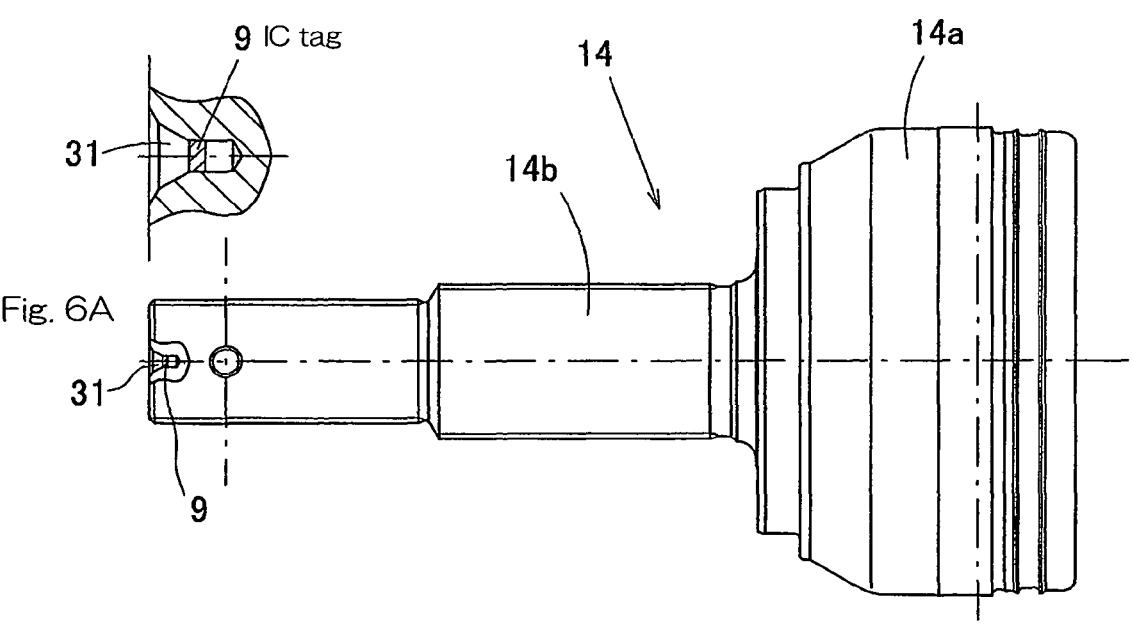
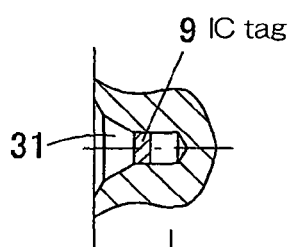

Fig. 10A  Fig. 10B  Fig. 10C  Fig. 10D
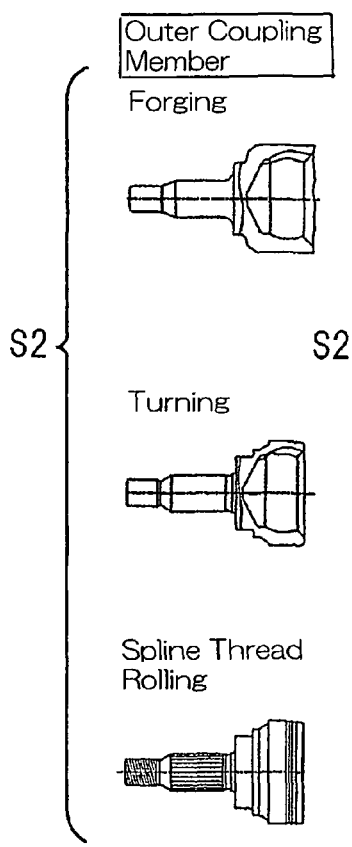
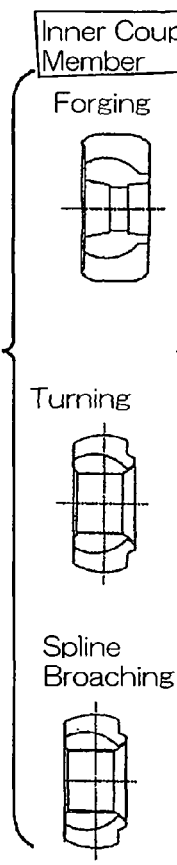
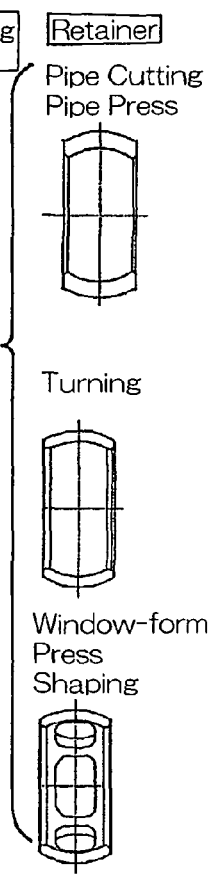
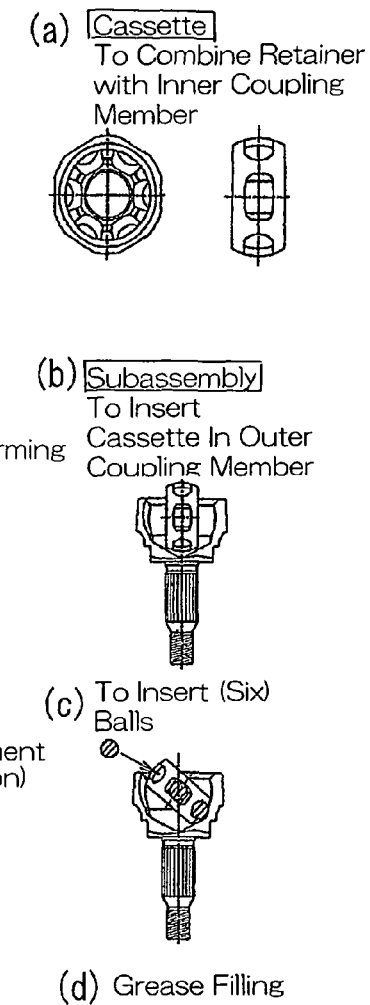
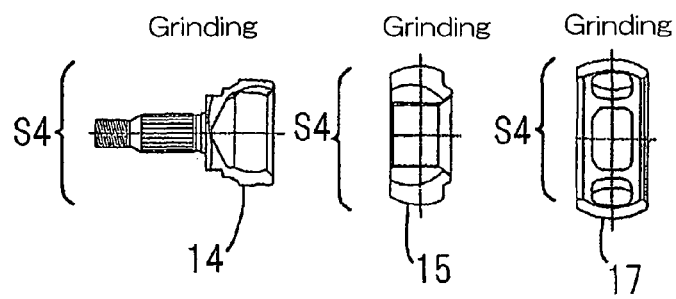

Fig. 11A
Outer Coupling Member
Forging

Fig. 11B
Inner Coupling Member
Forging

Fig. 11C
Retainer
Forging

Fig. 11D
Cassette
To Combine Retainer with Inner Coupling Member

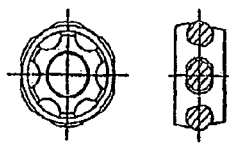

To insert (Six) Balls

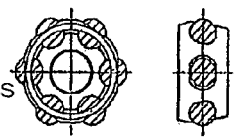

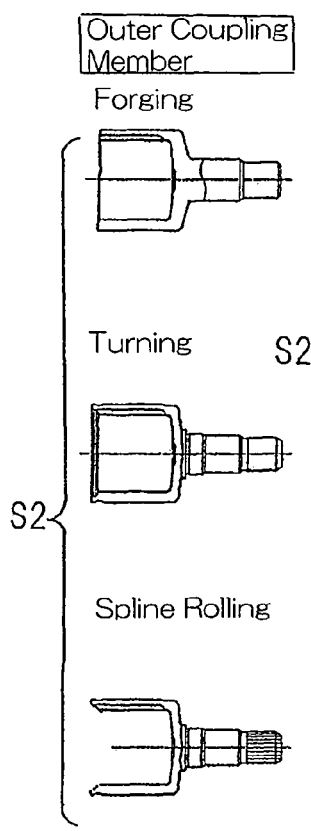

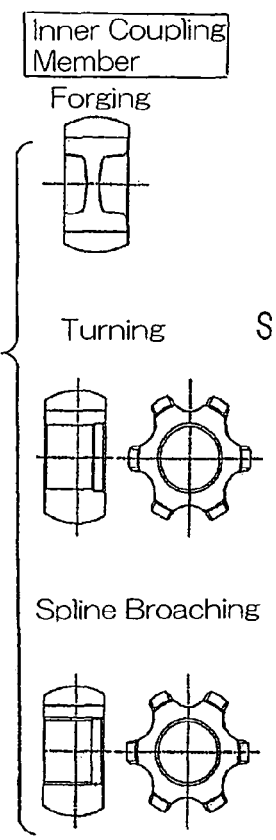

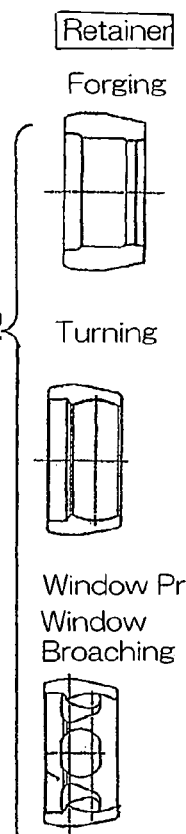

S2: Turning — Turning — Turning
Spline Rolling — Spline Broaching — Window Press / Window Broaching S3: Heat Treatment (High Frequency) — Heat Treatment (Carburization) — Heat Treatment (Carburization)

S4: Grinding — Grinding — Grinding

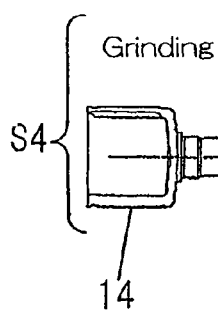
14

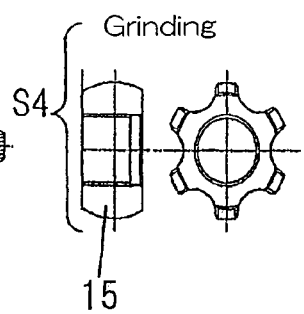
15

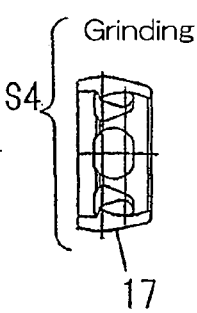
17

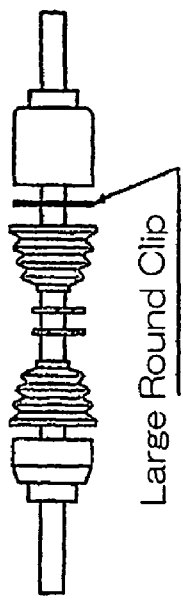
Fig. 13A
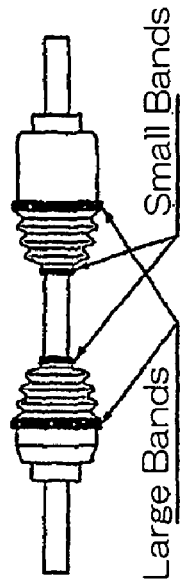
Fig. 13B
Fig. 13C
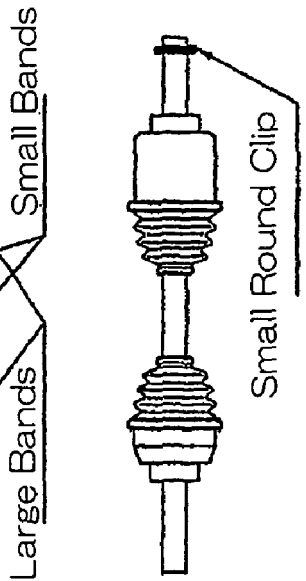
Fig. 13D
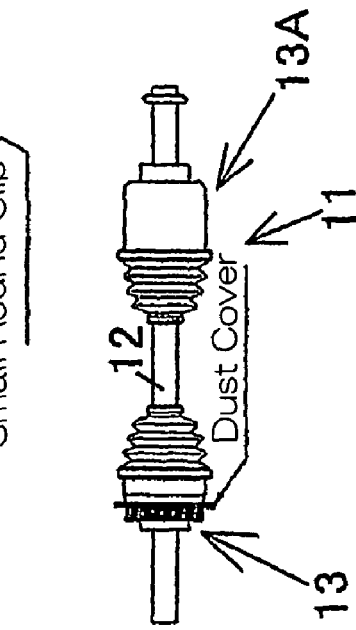
Fig. 13E
Fig. 13F
Fig. 13G
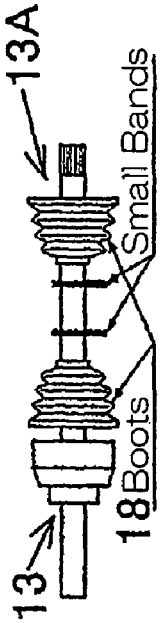
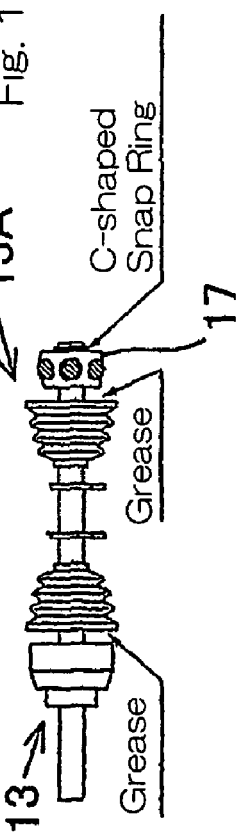
Fig. 13H

CONSTANT VELOCITY UNIVERSAL JOINT AND QUALITY CONTROL METHOD FOR THE SAME

BACKGROUND OF THE INVENTION

1. Field of the Invention

The present invention relates to a constant velocity universal joint used in a car and an industrial machinery and a method of controlling the quality thereof with the use of an IC tag.

2. Description of Prior Art

In recent years, demands for the traceability of an object of interest, that is, demands for the capability of pursuing the history, application and/or whereabouts of an object of interest are increasing. In the quality control of mechanical products, for example, constant velocity universal joints, the quality of every steps (material purchase step, forging step, heat treatment step, grinding step and so on) of the manufacturing process ranging from material purchase to completion of manufacture and the manufacturing history of, for example, lots are desired to be confirmed on one-to-one basis or by unit of lots for each of the mechanical products.

In automotive vehicles, since general mechanical products are controlled in lot units and lot-by-lot sampling inspection procedure is carried out for each lot, the manufacturing history in lot units is required. Once the manufacturing history is known, countermeasures to the future's improvements can be eased and the diagnosis of the service line can also be conducted easily. Also, determination of contamination of analogous articles can be facilitated. In the case of specialty mechanical products, individual examination is carried out and the manufacturing history is desired to be discernable on a one-by-one basis.

As a quality control method capable of clarifying such a manufacturing history, information generated during each manufacturing step has hitherto been recorded in forms and/or inputted to a terminal for a database.

On the other hand, in the distribution control and/or stock control, IC tags adopting the FRID capable of contactless communication are being compactized and come to be largely employed in the distribution of goods. In the manufacture of a product of, for example, an automotive vehicle, the control from the stage of manufacture to the stage of disposal with the use of the IC tags has been suggested. (See, for example, the Japanese Laid-open Patent Publication No. 2002-169858.) Since the IC tag is capable of achieving a contactless communication and has a large storage capacity, a high degree control is expected. Even in mechanical elements such as gears, it has been suggested to attach the IC tags to the product and store therein ID codes and various information associated with the ID codes so that information on the products can be controlled. (See, for example, the Japanese Laid-open Patent Publication No. 2002-49900.)

However, with respect to the constant velocity universal joints, an example, in which the IC tag is attached, has not yet been suggested. Also, if an attempt is made to attach the IC tag to the constant velocity universal joint, it is necessary to avoid the IC tag from disturbing the peripheral arrangement, to avoid interference of the IC tag with the peripheral arrangement and to avoid an accidental separation of the IC tag during the use thereof for a long time. The standard IC tags are often incapable of accomplishing a satisfactory information recording, when they are arranged on metals, due to radio wave absorption and radio wave reflection. If the IC tags of a special construction capable of being arranged on metals are used, they will become expensive, which lead to increase of the cost of the constant velocity universal joints.

The conventional control of mechanical elements with the use of the IC tags deals with the control of information obtained at manufacturing stages and the control of information concerning the product distribution, and no suggestion has been made yet to control the status of actual use of the mechanical elements subsequent to shipment.

The constant velocity universal joint utilized in association with, for example, a drive shaft of an automotive vehicle is generally designed to have a service life corresponding to the life of the automotive vehicle. Accordingly, if one can ascertain how it is used in the market, it will be useful as information for the future's designing.

However, no clue is generally available, which is necessary to know how the constant velocity universal joint is used and, therefore, confirmation of the actual use thereof in a particular status is impossible to achieve. Although an attempt is made to store and control the status-of-use of the automotive vehicle itself, it is not sufficient as information necessary to control the status-of-use of the constant velocity universal joint. Also, in the event that the constant velocity universal joint is replaced with a fresh one in the automotive vehicle, it is not easy to know the status-of-use of the new constant velocity universal joint.

When it comes to the regular servicing of the constant velocity universal joint that takes place during an automobile inspection or the like, it often occurs that indications of the manufacturer's serial number, and/or the date of manufacture and the place of manufacture, imprinted on the constant velocity universal joint are necessary.

However, the indications such as the manufacturer's serial number, the date of manufacture and the place of manufacture, which are imprinted on the constant velocity universal joint, are not readily available unless the constant velocity universal joint is dismantled. Because of this, disassembling and reassembling require a substantial amount of labors. In general, the constant velocity universal joint must be removed to enable the information such as the manufacturer's serial number to be confirmed and this is indeed laborious and costly.

In the suggested example of the quality control method using the IC tags, various pieces of information concerning mechanical elements, for example, gears, are recorded directly in the IC tag attached to each of the mechanical elements or identification information is recorded in the IC tag attached to the mechanical element, so that when check is made to the database, the type of material, the lot control information, various history data and others, all associated with the mechanical elements can be ascertained. However, it may often occur that with those information on the mechanical elements, a cause of a trouble occurring in some of the mechanical elements cannot be clarified. By way of example, the difference in quality may arise even due to the difference in processing conditions at each of the process steps, and such difference in processing condition cannot be recognized from a result of examination.

The constant velocity universal joint is made up of a plurality of elements such as an outer race or outer coupling member, an inner race or inner coupling member, rolling elements and a retainer. No traceability is available to identify the difference in quality of the individual element while the examination result of the constant velocity universal joint after assembled is obtained. Since in the constant velocity universal joint, even the slight difference in material and precision brings about a substantial difference in performance, the hitherto suggested example of the quality control method utilizing the IC tags is incapable of resolving the problem.

Also, in the case of the control of the process steps, the conventional control method, in which for each process step, records are manually written in a book and/or inputted in a terminal, requires a substantial amount of labor and, therefore, it is indeed difficult to record a large amount of information in detail meticulously. In particular, when it comes to mechanical products, for example, constant velocity universal joints, each of which is made up of a plurality of elements produced in lots in all stages of the manufacturing process including a step of material purchase, a grinding step, a forging step and then a heat treatment step, the control of each element in each step of the manufacturing process is complicated and a substantial amount of labor is required in accomplishing manual recording of the information and inputting operation. Because of this, it is difficult to meet with the demands for the detailed history information on the mechanical products and, also, the control requires a substantial amount of cost.

In view of the foregoing, the application of the IC tags to the constant velocity universal joint has been contemplated, but the control method such as used in connection with automotive vehicles cannot be applied to the constant velocity universal joints. In the case of the example suggested in the previously mentioned patent document (the Japanese Laid-open Patent Publication No. 2002-169858), the IC tag is attached to an automotive vehicle itself, which is an object to be controlled, and information on each of various manufacturing steps is recorded in the IC tag. The IC tag is attached to a frame or the like. However, in the case of the constant velocity universal joint, since the constant velocity universal joint has no element, which provides a complete fiducial such as the frame or the like in the automotive vehicle and since in the manufacturing process each element is manufactured through, for example, the forging and heat treatment steps, it is difficult to secure the IC tag to the constant velocity universal joint. Also, in the constant velocity universal joint, since the outer race, the inner race, the retainer and so on are individually controlled after the manufacturing process including the step of material purchase, the forging step, the heat treatment step, the grinding step and so on, the application of the IC tag to the quality control poses a problem of how it should specifically be used and, therefore, the efficient application of the IC tag is difficult to achieve.

SUMMARY OF THE INVENTION

A primary object of the present invention is to provide a constant velocity universal joint, in which information can be recoded.

A second object of the present invention is to provide a quality control method for the constant velocity universal joint, in which the information can be readily obtained with no need to dismantle the bearing and which can cope quickly and properly with the regular servicing or the like.

A third object of the present invention is to provide a status-of-use control method for the constant velocity universal joint, in which the status of actual use subsequent to shipment can easily be controlled.

The constant velocity universal joint of the present invention is attached with an IC tag capable of accomplishing a contactless communication. This constant velocity universal joint includes, for example, an outer race or outer coupling member, an inner race or inner coupling member and rolling elements interposed between the inner race and the outer race for transmitting rotation between the outer and inner races. The rolling elements may be either balls or rollers. Also, the constant velocity universal joint may be either a fixed type constant velocity universal joint, that is, the type in which the outer race and the inner race do not axially move relative to each other, or a sliding type constant velocity universal joint, that is, the type in which the outer race and the inner race are axially movable relative to each other.

When the IC tag is attached to the constant velocity universal joint, information concerning this constant velocity universal joint can be recorded in the IC tag and the information so recorded can be read out contactless and, therefore, identification of the constant velocity universal joint and any other control relating to the constant velocity universal joint can be accomplished.

The constant velocity universal joint utilized in an automotive vehicle is generally equipped with a boot made of rubber or resin and used to cover an opening of the outer race. The IC tag may be attached to this boot.

Since the boot is made of either rubber or resin, the standard IC tag of a kind that cannot be arranged directly on a metal can be effectively utilized to accomplish a satisfactory radio communication without being disturbed by radio wave absorption or reflection. Also, a special treatment, which would otherwise be required when the IC tag is arranged on a metal, is not needed.

The boot referred to above generally includes a bellows, and large and small diameter fixing portions continued from opposite ends of the bellows, respectively, and adapted to be fixed to an outer periphery of the outer race and an outer periphery of a shaft member coupled with the inner race. The IC tag referred to above may be attached to an outer diametric portion or an outer diametric exposed portion adjacent the large diameter fixing portion in the bellows.

Since the bellows has a major portion thereof, which undergoes extending and bending motions repeatedly, it is not so feasible from the viewpoint of attaching security. Also, since respective outer peripheries of the fixing portions are utilized as the positions, at which the metallic bands are fastened, respectively, and are therefore concealed, communication is difficult. However, the outer diametric portion of the bellows adjacent the large diameter side fixing portion is where they will not be adversely affected by the bending motion of the constant velocity universal joints, attaching to this site is effective to achieve a firm fixture enough to avoid a possible separation of the IC tag for a long time regardless of the repeatedly occurring bending motion.

The IC tag may be attached to an end face of one of the fixing portions that are continued from the opposite ends of the bellows of each of the boots. Since this end face of the corresponding fixing portion is little affected by the bending motion of the constant velocity universal joint, attaching to this site is effective to achieve a firm fixture enough to avoid a possible separation of the IC tag for a long time regardless of the repeatedly occurring bending motion.

In the present invention, the IC tag capable of the contactless communication may be attached to the outer race. Since the outer race is a member of the constant velocity universal joint that is exposed to the outside, attaching of the IC tag to that location is effective to achieve communication easily.

Where the IC tag is attached to the outer race, the IC tag may be attached within a recess provided in an end face of a stem shaft of the outer race.

The end face of the stem shaft is provided with a recess for the support of a center that is used when various processes are worked on the outer race. Although this recess will become good for nothing when each of the constant velocity universal joints is completed, when this recess is utilized for the IC tag to be attached thereto, the IC tag can be installed as embedded therein without the necessity of a special processing.

In the present invention, the IC tag may be attached to a shaft member that is coupled with the inner race. In a case used in an automotive vehicle, the shaft member coupled with the inner race allows for an ambient space to be secured often and, therefore, attaching of the IC tag to this location is effective to facilitate communication.

Where it is attached to this shaft member, the IC tag may be attached within a recess provided in an end face of the shaft member. Even the end face of the shaft member is often provided with a recess for the support of a center that is used when various processes are worked on the outer race and if this recess is utilized for the IC tag to be attached therein, the IC tag can be installed as embedded therein without the necessity of a special processing.

Where the shaft member has opposite ends adapted to be coupled with respective constant velocity universal joints and an intermediate portion of the shaft member, which lie between respective sites, at which boots for the constant velocity universal joints are fixed, has a diameter greater than that of shaft end side portions, which lie on respective end sides of those sites, a mounting groove may be provided in an outer periphery of this intermediate portion of the shaft member and the IC tag may then be attached within this mounting groove.

The shaft member having its opposite ends coupled respectively with the constant velocity universal joints is employed in the form of a raw material having a diameter greater than the required diameter for the formation of those portions where the boots are fixed and has portions adjacent the shaft ends ground to the required diameter, but it may often exist that the shaft intermediate portion is rendered to be of a thickness generally equal to that of the raw material. In such case, the shaft intermediate portion is a portion which is excessive in terms of strength and if a mounting groove is provided in this portion and the IC tag is fitted within this mounting groove, the IC tag can be attached as embedded without incurring nay problem associated with reduction in strength of the shaft member. Also, in an application in automotive vehicles, if the IC tag is attached to the shaft intermediate portion of the shaft member, the ambient space is so large as to enable communication with the IC tag.

In the present invention, at least one of elements forming respective parts of the constant velocity universal joint may be applied with an embossed alphanumerical marking or symbol, with a mounting recess defined at a location near this embossed marking by means of engraving, and wherein the IC tag is attached within this mounting recess.

The embossed marking referred to above is representative of information such as, for example, a manufacturer's name and/or the lot number and, although it can be dispensed with if the IC tag is attached, the concurrent use with the IC tag is often preferred for the visual determination of a human being. When during the embossing the mounting recess for the IC tag is simultaneously formed by embossing, the IC tag can be attached as embedded without increasing the number of processing steps to form the mounting recess.

The constant velocity universal joint of the present invention may be of a type, in which the IC tag is recorded with identification information for identifying the constant velocity universal joint and manufacturing information on the constant velocity universal joint. The identification information includes, for example, the lot number, the manufacturing number for each of the products and others. The manufacturing information is information such as, for example, results of various examinations at the time of manufacture, processing conditions of processing machines and so on.

Once the identification information is discernable, various reference can be made easily. Also, if the manufacturing information can be read directly from the constant velocity universal joint, securement of the traceability can be easily performed.

An automotive vehicle drive shaft of the present invention includes a shaft member and two constant velocity universal joints coupled respectively with opposite ends of the shaft member, in which for one or both of the constant velocity universal joints, the constant velocity universal joint as described of any one of the foregoing structures of the present invention is employed. In such case, any one of the IC tags attached to the constant velocity universal joints may be recorded with identification information on the automotive vehicle drive shaft.

In the case of this construction, information on the whole of the drive shaft including the shaft member and the pair of the constant velocity universal joints can be recorded and controlled with the IC tags.

A quality/status-of-use control method for a constant velocity universal joint in accordance with the present invention is a method for controlling the constant velocity universal joint having the IC tag capable of a contactless communication attached thereto, in which while the IC tag is attached to the constant velocity universal joint, information concerning, or a status-of-use of, a quality control of the constant velocity universal joint is recorded in the IC tag.

Here, the information concerning the quality control is intended to encompass all kinds of information concerning the quality including the manufacture, the material and the examination. The status-of-use is intended to encompass all conditions of use such as, for example, the total number of revolutions, the temperature, the torque and so on, which may affect the service life of the constant velocity universal joint.

According to this method, since the IC tag attached to the constant velocity universal joint is recorded with the information on the constant velocity universal joint, the information recorded in the IC tag can be read out and a predetermined information can be confirmed when at any arbitrarily chosen time the tag reader is brought close to the constant velocity universal joint. If one has information concerning, for example, the range of the constant velocity universal joint, the information on the constant velocity universal joint to be pursued can be made available from the information read out therefrom. For this reason, without the constant velocity universal joint being dismantled from the automotive vehicle or machines, the information on the constant velocity universal joint can be available while, for example, the servicing worker visits a customer or gas is refilled at a gas station.

The quality/status-of-use control method for the constant velocity universal joint, which is one example of the present invention, includes a step of attaching the IC tag to the constant velocity universal joint, a step of recording information on a quality of the constant velocity universal joint in the IC tag attached to the constant velocity universal joint, a utilizing step of reading, at any arbitrarily chosen time subsequent to shipment, the information recorded in the IC tag and confirming a predetermined information from the information read out therefrom.

In the present invention, where the constant velocity universal joint is utilized in an automotive vehicle, the reading of the IC tag during the utilizing step may be carried out by the utilization of a tag reader while the constant velocity universal joint remains incorporated in the automotive vehicle and information concerning the constant velocity universal joint may be made available by means of an information processor connected wired or wireless with the tag reader or an information processor integrated with the tag reader. Also, the predetermined information referred to above includes such information as, for example, the size, performance and manufacturing method of the constant velocity universal joint.

The quality control method for the constant velocity universal joint in accordance with the present invention includes the following first to fifth quality control methods for the constant velocity universal joint.

The first quality control method for the constant velocity universal joint in accordance with the present invention is a quality control method for the constant velocity universal joint, in which the constant velocity universal joint makes use of the IC tag capable of the contactless communication and is controlled by recording a predetermined information on the constant velocity universal joint, which method includes:

a step of attaching an IC tag to the constant velocity universal joint through one of a plurality of elements which form respective parts of the constant velocity universal joint;

a step of recording information on a manufacturing process of the constant velocity universal joint to the IC tag attached to the constant velocity universal joint; and a step of reading, at any arbitrarily chosen time subsequent to shipment, the information recorded in the IC tag and confirming a predetermined information from the information read out therefrom.

The second quality control method for the constant velocity universal joint in accordance with the present invention is a quality control method for the constant velocity universal joint, which utilizes a database for storing a predetermined information, concerning the constant velocity universal joint, in association with the identification information of the constant velocity universal joint, stored contents of which are extractable by the identification information referred to above, and an IC tag capable of the contactless communication, and which method includes:

a step of attaching the IC tag to the constant velocity universal joint through one of a plurality of elements forming respective parts of the constant velocity universal joint;

a step of recording an identification information on the constant velocity universal joint in the IC tag in accordance with the database at a time of shipment or by a time of delivery to a customer and, also, recording a manufacturing process of the constant velocity universal joint; and an information reading and utilizing step of reading, at any arbitrarily chosen time subsequent to shipment, the information recorded in the IC tag and confirming the information on the manufacturing process by comparing the information read out with the database.

The third quality control method for the constant velocity universal joint in accordance with the present invention is a quality control method for the constant velocity universal joint, which utilizes a database for storing a predetermined manufacturing information on the constant velocity universal joint, stored contents of which are extractable, and an IC tag capable of the contactless communication, and which includes:

a step of attaching the IC tag to the constant velocity universal joint through one of a plurality of elements forming respective parts of the constant velocity universal joint;

a step of recording in the IC tag attached to the constant velocity universal joint, a predetermined shipment information of the constant velocity universal joint in accordance with the database; and a step of reading, at any arbitrarily chosen time subsequent to shipment, the information recorded in the IC tag and confirming the information on the constant velocity universal joint from the information read out therefrom or information obtained by comparing the read-out information with the database.

The above described first quality control method for the constant velocity universal joint is specifically a method, in which the IC tag is attached to the constant velocity universal joint and the traceability is enabled in connection with a quality control relying only on the information recorded in the IC tag and which includes the following steps.

This quality control method is a quality control method for controlling the constant velocity universal joint by recording in the IC tag, a predetermined manufacturing information concerning a process flow ranging from purchase of material associated with the constant velocity universal joint to a step of examination by way of a step of at least one of forging and turning, a heat treatment step and a grinding step, which method includes:

a step of attaching the IC tag to one of elements forming respective parts of the constant velocity universal joint during a manufacture of the constant velocity universal joint or at a time of completion of manufacture thereof;

a step of recording in the IC tag attached to the constant velocity universal joint at a time of shipment or by a time of delivery to a customer, at least one of processing condition information and material information at least one of the manufacturing steps for the constant velocity universal joint; and an information reading and utilizing step of reading the information recorded in the IC tag and confirming the at least one of the processing condition information and the material information from the information read from the IC tag at an arbitrary time subsequent to shipment.

According to this method, during the information reading and utilizing step at any arbitrarily chosen time subsequent to shipment, the material information or the processing condition information on any one of the forging and turning step, the heat treatment step and the grinding step can be confirmed. Since even the processing condition information can be confirmed, securement of the traceability or the like can easily be obtained even in the constant velocity universal joint, which require a severe quality and precision. In the case of this method, without using any separate database, the information can be controlled only with the IC tag and, therefore, in a facility where the processing condition information or the like is confirmed, the processing condition information or the like can be read out regardless of the access authority and communication facilities to the database.

The above described second quality control method for the constant velocity universal joint is specifically a method, in which the IC tag attached to the constant velocity universal joint and the database are utilized to enable the traceability in connection with the quality control and which includes the following steps.

This quality control method is a quality control method for controlling the constant velocity universal joint, in which with respect to the constant velocity universal joint, a database for storing, in association with an identification information, a predetermined manufacturing information concerning a process flow ranging from purchase of material associated with the constant velocity universal joint to a step of examination by way of a step of at least one of forging and turning, a heat treatment step and a grinding step, all associated with the constant velocity universal joint, stored contents of which can be extracted by the identification information, and the IC tag capable of the contactless communication are utilized to control the constant velocity universal joint, which method includes:

a step of attaching the IC tag to one of elements forming respective parts of the constant velocity universal joint during a manufacture of the constant velocity universal joint or at a time of completion of manufacture thereof;

a step of recording in the IC tag attached to the constant velocity universal joint at a time of shipment or by a time of delivery to a customer, an identification information on the constant velocity universal joint and at least one of processing condition information and material information at least one of the manufacturing steps for the constant velocity universal joint in accordance with the database; and an information reading and utilizing step of reading the information recorded in the IC tag at an arbitrarily chosen time subsequent to shipment and conducting from the information read out therefrom or information obtained by comparing the information read out therefrom with the database, one of a confirmation of material received, a confirmation of the manufacturing process, a confirmation of at least one of the processing condition information and the material information, and a confirmation of results of examination.

Even in this control method, during the information reading and utilizing step at any arbitrarily chosen time subsequent to shipment, the material information or the processing condition information on any one of the forging and turning step, the heat treatment step and the grinding step can be confirmed. Because of this, even in the constant velocity universal joint, which requires a severe quality and precision, securement of the traceability can be easily carried out. Also, since the IC tag attached to the constant velocity universal joint is recorded with the identification information and the database is recorded with various information in correspondence with the identification information, many of the pieces of information can be extracted from the database with no need to rely on the limited storage capacity of the IC tag. The capacity of the memory built in the IC tag, which is left unoccupied, can be used for the maintenance of the various histories subsequent to the shipment and/or subsequent to the delivery to the customer or the like.

The above described third quality control method for the constant velocity universal joint is a method enabling the traceability in connection with the quality control by the utilization of the IC tag attached to the constant velocity universal joint and the database and which includes the following steps. This quality control method is a method, in which with respect to the constant velocity universal joint, a database for storing, in association with an identification information, a predetermined manufacturing information concerning a process flow ranging from purchase of material associated with the constant velocity universal joint to a step of examination by way of a step of at least one of forging and turning, a heat treatment step and a grinding step, all associated with the constant velocity universal joint, stored contents of which can be extracted by the identification information, and the IC tag capable of the contactless communication are utilized and which includes:

a step of attaching the IC tag to one of elements forming respective parts of the constant velocity universal joint during a manufacture of the constant velocity universal joint or at a time of completion of manufacture thereof;

a step of recording in the IC tag attached to the constant velocity universal joint at a time of shipment or by a time of delivery to a customer, an identification information on the constant velocity universal joint and recording at least one of pieces of information including a date of manufacture, a place of manufacture, a brand of a filled grease, a gap between the neighboring elements, a term of warranty and handing cautions, all associated with the constant velocity universal joint, in accordance with the database; and an information reading and utilizing step of reading the information recorded in the IC tag at an arbitrarily chosen time subsequent to shipment and conducting from the information read out therefrom or information obtained by comparing the information read out therefrom with the database, one of a confirmation of material received, a confirmation of the manufacturing process, a confirmation of at least one of the processing condition information and the material information, and a confirmation of results of examination.

In the case of this method, during the information reading and utilizing step at any arbitrarily chosen time subsequent to shipment, it is possible to perform one of a confirmation of the material received, a confirmation of the manufacturing process, a confirmation of the processing condition and a confirmation of results of examination from the read information read from the IC tag or from the information obtained by referring the read information, read from the IC tag, with the above described database. It is also possible to confirm one of the date of manufacture, the place of manufacture, the brand of the filled grease, the gap between the neighboring elements, the term of warranty and handling cautions, all recorded in the IC tag. The date of manufacture, the place of manufacture, the brand of the filled grease, the gap between the neighboring elements, the term of warranty and handling cautions are those which are desired to be known immediately at various situations and, hence, the capability of reading directly from the IC tag without making reference to the database is convenient in terms of facilities and labor. Since the grease is available in various kinds depending on whether it is for high temperature use or low temperature use and on the manner of use thereof and is difficult to discern from the appearance, it is convenient if they can be read from the IC tag.

In the present invention, in any of the above described first to third quality control methods for the constant velocity universal joint, the following steps may be included. Namely, a step of recording in the IC tag for the manufacturing process, which is prepared for each of lot numbers of elements, a predetermined manufacturing information on a process flow ranging from material purchase of the elements forming respective parts of the constant velocity universal joint to a grinding step by way of a step of at least one of forging and turning and a heat treatment step, for each process step, and a step of reading this recorded information and recording portion or whole of the information so read out in the IC tag attached to the constant velocity universal join are included, and as the manufacturing information recorded in the IC tag for the manufacturing process, at least one of a processing condition information, associated with at least one of the manufacturing steps, and a material information is included.

As described above, if the manufacturing information on a process flow ranging from material purchase of the elements forming respective parts of the constant velocity universal joint to a grinding step by way of a step of at least one of forging and turning and a heat treatment step, for each process step, is recorded in the IC tag for the manufacturing process prepared for each of the lot numbers of the elements, recording of the detailed information as compared with that recorded manually in a record book can be accomplished and, also, since unlike the case in which it is inputted in the database by means of, for example, a terminal, the place where the information is inputted is the IC tag, visual recognition is possible thereby facilitating an inputting work without accompanying any error. Also, unlike the case in which all various pieces of information ranging from the material purchase of the elements to the grinding step through intermediate steps are recorded in the database, those pieces of information are possessed by the IC tag and, therefore, a load on the database is slight and control thereof is easy to achieve. Because of this, the detailed information can easily be controlled. Where the lot division changes for each process step, the IC tag prepared for each of the lot number of the elements is prepared for each lot that has been changed.

The recording of the manufacturing information during the manufacture of the elements may be made to the database. In other words, in the present invention, even in any one of the above described first to third quality control methods for the constant velocity universal joint, a step of recording a predetermined manufacturing information on a process flow ranging from material purchase of the elements forming respective parts of the constant velocity universal joint to a grinding step by way of a step of at least one of forging and turning and a heat treatment step and to a step of examination, in a time-of-manufacture database in association with a lot number of the elements or an identification number for each of the elements, and a step of recording this recorded information in the IC tag attached to the mechanical elements may be included.

For a control method, in which the IC tag for the manufacturing process prepared for each lot number is used in controlling the manufacturing information during the manufacture of the elements, the following method can be employed and, more specifically, any of the following fourth and fifth methods can be employed.

This quality control method for the constant velocity universal joint, in which the IC tag is employed for each lot is a method, in which with respect to the elements including an outer race and an inner race and forming respective parts of the constant velocity universal joint, for each of manufacturing steps ranging from purchase of material to completion and then to completion of an examination, the IC tag is prepared for each lot of the manufacturing steps, wherein the IC tag prepared for each lot of the manufacturing steps is rendered to be the same IC tag as that for the lot corresponding to one step on an upstream side or an IC tag succeeding the information on the IC tag for the lot corresponding to the one step on the upstream side, and the lot number of that step and information on that step are recorded in the IC tag prepared for each lot of that step.

In the case of this method, even though there is a lot division at a step on the downstream side, the information recorded at the step on the upstream side can be succeeded in the new IC tag. Because of this, the IC tag for the lot at the time of completion of the manufacture for all of the elements can have information on the entire steps recorded therein.

The fourth quality control method for the constant velocity universal joint in accordance with the present invention is a quality control method for the constant velocity universal joint that is examined individually. This quality control method for the constant velocity universal joint is a quality control method for the constant velocity universal joint, which is assembled with a plurality of kinds of elements, which are manufactured through a manufacturing process ranging from purchase of material to a grinding step by way of a step of at least one of forging and turning, and a heat treatment step and is individually examined and which includes the following steps (1) to (4) and employs substeps as will be described later with respect to the constant velocity universal joint assembled with the elements.

(1) At a time of purchase of material for the elements, a step of recording in an IC tag, prepared for each material lot, information concerning a material lot number of the corresponding material lot and material received, at a time of purchase of the material for each of the elements, (2) during the forging and turning step, a step of preparing, for each forging and turning lot, an IC tag for each material lot or an IC tag succeeding the information, recorded in the IC tag for each material lot, and recording in those IC tags, the forging and turning lot number of the corresponding forging and turning lot and information obtained during the forging and turning step, and (3) during the heat treatment step, a step of preparing, for each heat treatment lot, a different IC tag for each forging lot or an IC tag succeeding the information, recorded in the different IC tag for each forging lot, and recording in those IC tags, the heat treatment lot number of the corresponding heat treatment lot and information obtained during the heat treatment step.

(4) During the examination step subsequent to the grinding step, a step of preparing, for each element or each set of the elements of the same kind, which form a unit for examination, an IC tag for each heat treatment lot or an IC tag succeeding the information, recorded in the different IC tag for each heat treatment lot, and recording in those IC tags, the corresponding grinding lot number and information obtained during the examination step.

The IC tag is, during a period prior to assemblage and after the assemblage, attached to the constant velocity universal joints each assembled with the elements and is recorded with at least the manufacturing number which is out of the manufacturing number unique to the individual constant velocity universal joint and the information recorded in the IC tag after the examination of the elements used to form the constant velocity universal joints. In correspondence with the manufacturing number, the database is recorded with the information recorded in the IC tag after the examination of the elements used to form the constant velocity universal joints and examination information after completion of the constant velocity universal joint.

It is to be noted that the flow from the material purchasing step to the grinding step by way of the forging and turning step and the heat treatment step represent broadly divided sections of the flow from purchase of material to completion of the elements and each of those steps may be made up of a plurality of substeps or each step may include a step not included within the specific nomenclature. By way of example, where the turning is carried out subsequent to the forging, followed by the heat treatment, the turning step may be included within the forging step. Also, during the step, in which information obtained at each of the forging and turning step, the heat treatment step and the grinding step such as in (2) to (4) described above, it may be recorded together with the processing condition information at each of the forging and turning step, the heat treatment step and the grinding step. Also, during the step, in which information obtained at each of the forging and turning step, the heat treatment step and the grinding step such as in (2) to (4) described above, it may be recorded together with the processing condition information at each of the forging and turning step, the heat treatment step and the grinding step.

According to this quality control method, since the information on the history ranging from the purchase of material for the elements to contents of examination after completion of the constant velocity universal joint is stored in the database and the manufacturing number is recorded in the IC tag attached to the constant velocity universal joint, it is possible to control the history information in one-to-one relation with the constant velocity universal joint, when the manufacturing number is referred to the database. Since the information generated at each of the manufacturing steps of the elements is recorded in the IC tag, prepared for each lot of each manufacturing step for each manufacturing step together with the lot number, it is possible to control the detailed history information.

Accordingly, dealing with, for example, future's improvements can be facilitated and diagnosis of the life can also be facilitated. Since the information on each of the processing step is recorded in the IC tag prepared for each lot of the respective manufacturing step, recording of the detailed information as compared with that recorded manually in a record book is possible and, also, since unlike the case in which it is inputted in the database by means of, for example, a terminal, the place where the information is inputted is the IC tag, visual recognition is possible thereby facilitating an inputting work without accompanying any error. Also, unlike the case in which all various pieces of information ranging from the material purchase of the elements to the grinding step through intermediate steps are recorded in the database, those pieces of information are possessed by the IC tag and, therefore, a load on the database is slight and control thereof is easy to achieve. Because of this, the detailed information can easily be controlled. Yet, since the manufacturing number of the constant velocity universal joint is recorded in the IC tag attached to the constant velocity universal joint, this IC tag can be used in various applications subsequent to the manufacture, for example, in shipment control, distribution control, custom control and maintenance control.

The fifth quality control method for the constant velocity universal joint in accordance with the present invention is a quality control method for the constant velocity universal joint that is examined individually. This quality control method for the constant velocity universal joint employs the following manufacturing steps (1) to (3) and (4') with respect to the constant velocity universal joint, which is assembled with a plurality of kinds of elements of the constant velocity universal joint, which are manufactured through a manufacturing process ranging from purchase of material to a grinding step by way of a step of at least one of forging and turning, and a heat treatment step, and is individually examined for each lot, and employs the substeps as described later with respect to the constant velocity universal joint assembled with the elements. The manufacturing steps (1) to (3) are identical with that of the previously described fourth quality control method for the constant velocity universal joint.

(4') During the examination step subsequent to the grinding step, a step of preparing an IC tag for each heat treatment lot or an IC tag succeeding the information, recorded in the IC tag for each heat treatment lot, and recording in those IC tags, the corresponding grinding lot number and information obtained during the examination step.

The constant velocity universal joint assembled with the elements is attached with the IC tag during a period prior to assemblage and after the assemblage and, of the manufacturing lot number and information recorded in the IC tag after the step of examination of the elements used in the constant velocity universal joint, at least the manufacturing lot number is recorded in the IC tag so attached to the constant velocity universal joint and, in correspondence with the manufacturing lot number, the database is recorded with the information, recorded in the IC tag after the step of examination of the elements used in the constant velocity universal joint, and the information on the examination after completion of the constant velocity universal joint.

It is to be noted that during the step such as each of the forging and turning step, the heat treatment step and the grinding step represented by (2) to (4') above, the processing condition information on those forging and turning step, heat treatment step and grinding stem may be recorded together.

In the case of this quality control method, although it is a control for each manufacturing lot of the constant velocity universal joint, but not a one-to-one control, other functions and effects such as explained in connection with the previously described first quality control method for the constant velocity universal joint can be obtained. Reference to the database is carried out relying on the lot number obtained from the IC tag attached to the constant velocity universal joint.

In the present invention, the IC tag prepared for each lot of the manufacturing steps may be attached to a container or the like containing the material of the same lot or the elements for the manufacturing steps. By way of example, the IC tag prepared for each of the material lot, the IC tag prepared for each of the forging lot and the IC tag prepared for the heat treatment step may be attached to a container containing a number of materials of the same material lot, a container containing a number of elements of the sake forging lot and a container containing the elements of the same heat treatment lot.

Attachment of the IC tag to the container may be carried out directly or to a tag attached to the container for visual recognition. Attachment of the IC tag to the container may be made in a removable fashion.

When the IC tag is attached to the container or the like, the IC tag prepared for each lot can be moved at all times together with the elements and, therefore, handling of the IC tag is easy. Also, recording of the information in the IC tag can be carried out in a transport path of the elements.

The status-of-use control method for the constant velocity universal joint in accordance with the present invention is to record, while the IC tag capable of the contactless communication is attached to the constant velocity universal joint, the status-of-use of the constant velocity universal joint is recorded in this IC tag. The status-of-use of the constant velocity universal joint, which is recorded in this IC tag includes the total number of revolutions, the maximum number of revolutions, the temperature and the torque and at least one of them is preferably recorded. The total number of revolutions may be information on the travel distance in the case of the automotive vehicle.

As described above, if the IC tag is attached to the constant velocity universal joint and the status-of-use is stored in such IC tag, the status of actual use of the constant velocity universal joint can be read out at a later stage and can then be confirmed. Since the IC tag capable of the contactless communication is used, reading of the information, which is the status-of-use, can readily be accomplished.

The constant velocity universal joint referred to hereinabove may be a part of the automotive vehicle drive shaft. In such case, a reader/writer capable of communicating with the IC tag and a write-in processor for writing a predetermined information in the IC tag through the reader/writer may be mounted on an automotive vehicle so that the status-of-use can be recorded in the IC tag through this write-in processor.

Although the IC tag generally requires no electric power source for the storage of information, writing of the information in the IC tag requires the use of the reader/writer. If the reader/writer and the write-in processor are mounted on the automotive vehicle, writing of the status-of-use of the constant velocity universal joint can be automatically accomplished without requiring a vehicle driver to manipulate. In such case, the write-in processor may have a function of regularly recording the status-of-use. The regular recording may be carried out at predetermined intervals of time such as, for example, once a day or at the time when a condition is satisfied other than time such as, for example, each time a key of the automotive vehicle is turned on.

By those procedures, recording of the status-of-use of the constant velocity universal joint in the IC tag can be accomplished assuredly without being forgotten or performed arbitrarily.

The write-in processor may record, as the status-of-use, one or both of a travel distance and a maximum speed and wherein recording of one or both of the travel distance and the maximum speed is carried out by updating contents recorded in the IC tag. Recording of the travel distance and the maximum speed may be accomplished by updating the contents recorded in the IC tag. Information on the travel distance and the maximum speed corresponds respectively to the total number of revolutions and the maximum number of revolutions.

The travel distance and the maximum speed can be discerned from control contents possessed by the automotive vehicle itself. If they are recorded in the IC tag of the constant velocity universal joint, the recording of such constant velocity universal joint remains even when the constant velocity universal joint is replaced.

Although the storage capacity of the IC tag decreases when the IC tag is compactized, recording of the travel distance and the maximum speed in the form as updated is effective to avoid an accident associated with the storage capacity. It is, however, to be noted that as far as the travel distance is concerned, it is preferred to record as an updated value, the value obtained by integrating the travel distances before and after replacement of the constant velocity universal joint, in the event that the constant velocity universal joint is replaced.

In the present invention, a sensor for detecting an object to be detected of the constant velocity universal joint may be connected with the IC tag, in which case as the status-of-use, detected information of this sensor is recorded in the IC tag. The sensor referred to above is, for example, a temperature measuring means for measuring the temperature of the constant velocity universal joint or a strain gauge capable of detecting the torque acting on the constant velocity universal joint.

Since the constant velocity universal joint evolves heat as a result of internal friction and, therefore, if the temperature is discernable, it is convenient for the control of the status-of-use of the constant velocity universal joint. Also, since if used under an unreasonable load condition, an abnormal torque generates, recording of the torque as well is convenient for the technical clarification in various applications and the determination of whether the replacement is necessary.

In the present invention, the constant velocity universal joint may have a boot as an element and the IC tag may be attached to at least this boot.

While the standard IC tag cannot be attached directly to a metallic surface due to radio wave reflection, since the boot is made of rubber or a synthetic resin, attachation directly to the IC tag poses no problem associated with reflection and, therefore, an excellent communicating capability can be obtained. Also, since the boot is a component part that is arranged in the most outer locations of the constant velocity universal joint, attachation of the IC tag to this facilitates a good communication with no obstruction to the communication intervening. Because of those, it is convenient to record the identification information on the constant velocity universal joint, the information on the examination subsequent to the completion of manufacture and the information on maintenance or distribution in the IC tag attached to the boot. Even the information on the boot may be recorded in the IC tag attached to such boot.

The constant velocity universal joint may have a grease filled therein during assemblage thereof, in which case the IC tag attached to the constant velocity universal joint is preferably recorded with the date of assemblage of such constant velocity universal joint.

Since the grease deteriorate with passage of time, the control can be facilitated if the date of assemblage is discernable.

In the present invention, the IC tag attached to the constant velocity universal joint may be recorded with information concerning whereabouts of the constant velocity universal joint from shipment of the constant velocity universal joint to delivery thereof to a customer. In this way, the shipment control, the distribution control, the custom control and/or the maintenance control can be facilitated.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 5A is an enlarged front view of a boot of the sliding type constant velocity universal joint;

FIG. 5B is a end view of the sliding type constant velocity universal joint;

FIG. 6A is an enlarged front view of an outer race of the fixed type constant velocity universal joint;

FIG. 6B is a fragmentary enlarged view of a portion of the outer race shown in FIG. 6A;

FIG. 10 is an explanatory diagram showing a process of manufacturing the fixed type constant velocity universal joint;

FIG. 11 is an explanatory diagram showing the process of manufacturing the sliding type constant velocity universal joint;

FIG. 13 is an explanatory diagram showing a process of assembling the automotive vehicle drive shaft;

DETAILED DESCRIPTION OF THE EMBODIMENTS

Preferred embodiments of the present invention will now be described with particular reference to the accompanying drawings.

Figure 1:
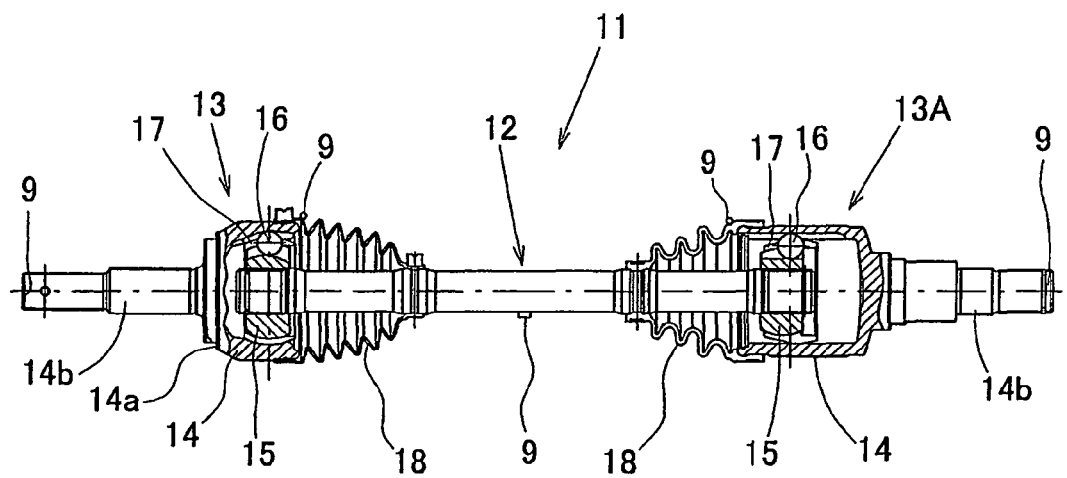
FIG. 1 is a sectional view of an automotive drive shaft utilizing a constant velocity universal joint to which a quality control method for a constant velocity universal joint according to a first preferred embodiment of the present invention is applied.
Figure 2:
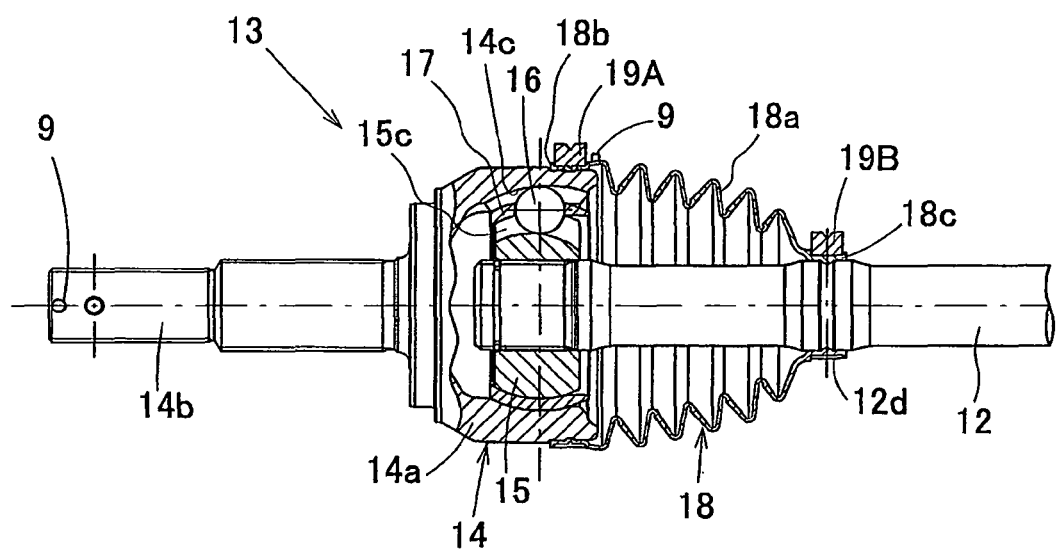
FIG. 2 is a sectional view of a fixed type constant velocity universal joint.
Figure 3:
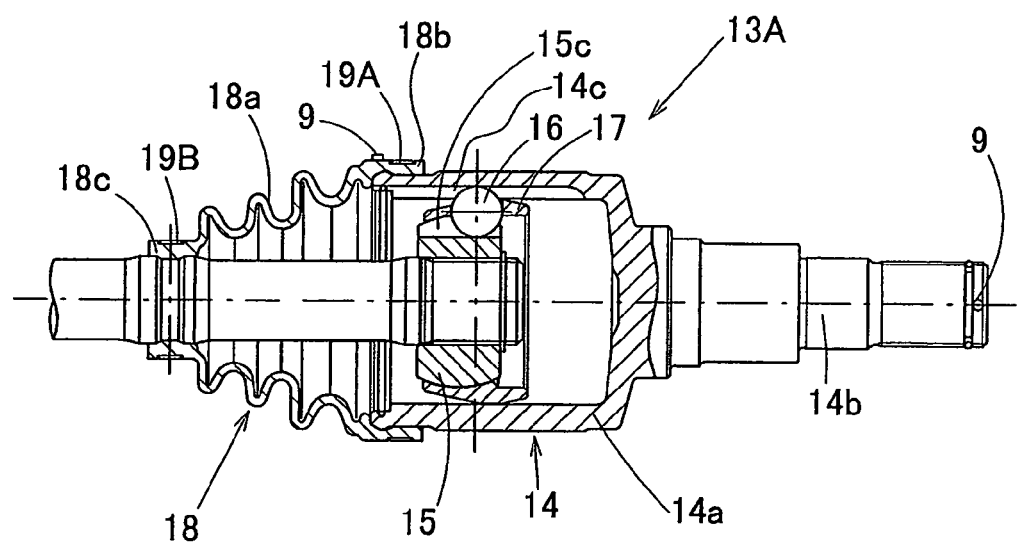
FIG. 3 is a sectional view of a sliding type constant velocity-universal joint.

Specifically, FIG. 1 illustrates a vehicle drive shaft 11 having a pair of constant velocity universal joints mounted thereon, and FIGS. 2 and 3 illustrate those constant velocity universal joints on an enlarged scale, respectively. Referring to FIG. 1, the vehicle drive shaft 11 is made up of an intermediate shaft 12, a fixed type constant velocity universal joint 13 mounted on one of opposite ends of the intermediate shaft 12 and a sliding type constant velocity universal joint 13A mounted on the other of the opposite ends of the intermediate shaft 12. The fixed type constant velocity universal joint 13 is adapted to be drivingly coupled with a wheel support bearing assembly (not shown) of an automotive vehicle, whereas the sliding type constant velocity universal joint 13A is adapted to be drivingly coupled with a drive transmission system (not shown) of an automotive engine.

As shown in FIG. 2, the fixed type constant velocity universal joint 13 includes as major elements an outer race or outer coupling member 14, an inner race or inner coupling member 15 mounted on the intermediate shaft 12 for rotation together therewith, a row of balls 16, which are rolling elements, and a ball retainer 17, all of those elements being made of a steel material. In addition to those major elements, the fixed type constant velocity universal joint 13 has a boot 18 mounted thereon.

The outer race 14 includes a generally bowl-shaped joint mouth 14a having an opening at one end thereof, and a stem shaft 14b extending outwardly from a closed end of the joint mouth 14a. The joint mouth 14a has an inner peripheral surface formed with a plurality of guide grooves 14c of a substantially semispherical sectional shape that is defined therein so as to extend arcuately in an axial direction, that is, in a direction parallel to the longitudinal axis of the stem shaft 14b. On the other hand, the inner race 15 has an outer peripheral surface formed with a plurality of guide grooves 15c of a substantially semispherical sectional shape that is defined therein so as to extend arcuately in an axial direction, that is, in a direction parallel to the longitudinal axis of the intermediate shaft 12. With the inner race 15 received within the joint mouth 14a of the outer race 14, the guide grooves 15c in the inner race 15 cooperate with the guide grooves 14c in the outer race 14 to define respective arcuate ball tracks that are juxtaposed circumferentially of the circle having a center of curvature coincident with the center of curvature of the arcuate shape of the guide grooves 15c. The balls 16 are rollingly accommodated in those arcuate ball tracks, while they are orderly retained in position in the same plane by the ball retainer 17 having circumferentially deployed pockets defined therein to receive the respective balls 16.

It is to be noted that the inner race 15 has a center bore defined therein and formed with a plurality of axially extending serrations or splines and is, hence, splined to the intermediate shaft 12 for rotation together therewith.

The boot 18 is made of an elastic material, for example, rubber or a synthetic resin and is utilized to cover the opening of the outer race 14. This boot 18 includes a bellows 18a having large and small diameter open ends 18b and 18c opposite to each other. With the boot 18 mounted on the vehicle drive shaft 11, the large diameter open end 18b of the bellows 18a is capped on an outer peripheral edge portion of the outer race 14 on the side of the opening and is then fixed thereto by means of a boot band 19A and, on the other hand, the small diameter open end 18c of the bellows 18a is mounted on a boot seat 12d formed on an outer periphery of the shank 12 and is then fixed thereto by means of a boot band 19B.

The sliding type constant velocity universal joint 13A shown in FIG. 3, which is shown in FIG. 1 as mounted on the vehicle drive shaft 11 together with the fixed type constant velocity universal joint 13, is of a construction substantially similar to the fixed type constant velocity universal joint 13. The fixed type and the sliding type differ from each other in that the outer and inner races 14 and 15 of the fixed type constant velocity universal joint 13 are bendable relative to each other whereas the outer and inner races 14 and 15 of the sliding type constant velocity universal joint 13A are slidable axially relative to each other in a direction close towards and away from each other. Specifically, the guide grooves 14c and 15c defined in the outer and inner races 14 and 15 of the sliding type constant velocity universal joint 13A extend straight in parallel to the vehicle drive shaft 11 as shown in FIG. 3, whereas the guide grooves 14c and 15c of the fixed type constant velocity universal joint 13 are arcuately curved relative to the vehicle drive shaft 11 as shown in FIG. 2.

Thus, component parts of the sliding type constant velocity universal joint 13A, which correspond functionally to those of the fixed type constant velocity universal joint 13, are designated by like reference numerals used to denote those functionally corresponding component part of the fixed type constant velocity universal joint 13 and the details thereof are not reiterated for the sake of brevity.

Figure 14:
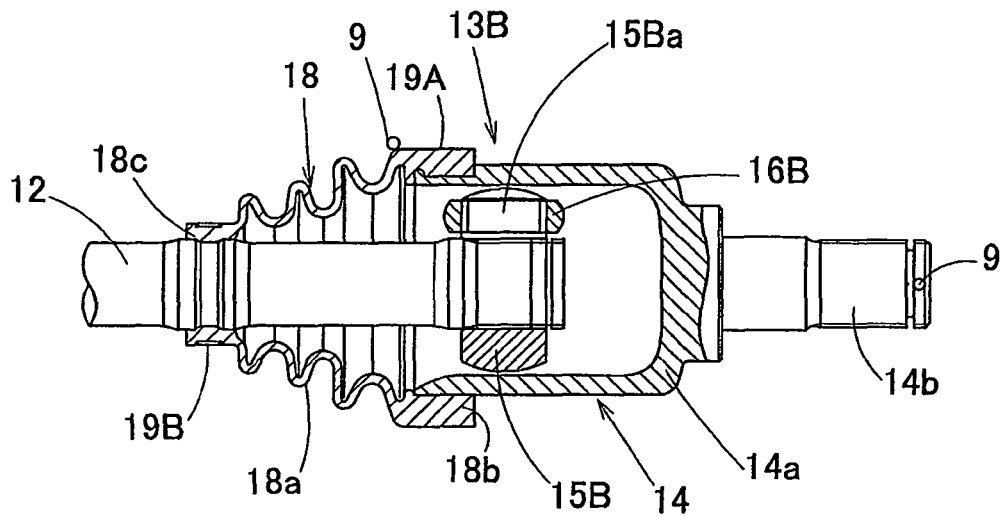
FIG. 14 is a sectional view of a tripod type constant velocity universal joint.

It is to be noted that for the sliding type constant velocity universal joint 13A, a constant velocity universal joint 13B of a tripod type as shown in FIG. 14 may be employed. The tripod type constant velocity universal joint 13B is of a structure, in which the inner race 15B is comprised of a tripod member having a trunnion 15Ba with rollers 16B rotatably mounted as rolling elements on trunnions integral with the trunnion 15Ba. Other structural features of this tripod type constant velocity universal joint 13B are substantially similar to those of the sliding type shown in and described with particular reference to FIG. 3.

The position of each of the fixed type constant velocity universal joint 13 and the sliding type constant velocity universal joint 13A, where an IC tag 9 is attached will now be described. Even in the case of the tripod type constant velocity universal joint 13B, the IC tag 9 is attached thereto in a manner similar to that which will now be described in connection with each constant velocity universal joint 13 and 13A, but the description thereof will not be made for the sake of brevity.

In the case where the IC tags 9 are attached to the constant velocity universal joints 13 and 13A, respectively, they are preferably attached to the boots 18, the outer races 14 or the intermediate shaft 12. Those positions are particularly advantageous in that the IC tags 9 can be exposed bare to the outside and, therefore, communication with the IC tags 9 will not be disturbed. In particular, since each of the boots 18 is made of rubber or synthetic resin, and even if the standard IC tags of a kind incapable of being arranged directly on a metal are employed for the IC tags 9, the radio communication can be accomplished satisfactorily without being disturbed by radio wave absorption or reflection. Also, no extra treatment is needed, which would be otherwise required when the IC tags 9 are to be fixedly placed on a metal.

When the IC tags 9 are attached to the constant velocity universal joints 13 and 13A, respectively, in the manner described above, information can be recorded in those constant velocity universal joints 13 and 13A and can be read therefrom on a non-contact basis, thus facilitating identification and any other control of the constant velocity universal joints 13 and 13A.

Figure 4A:
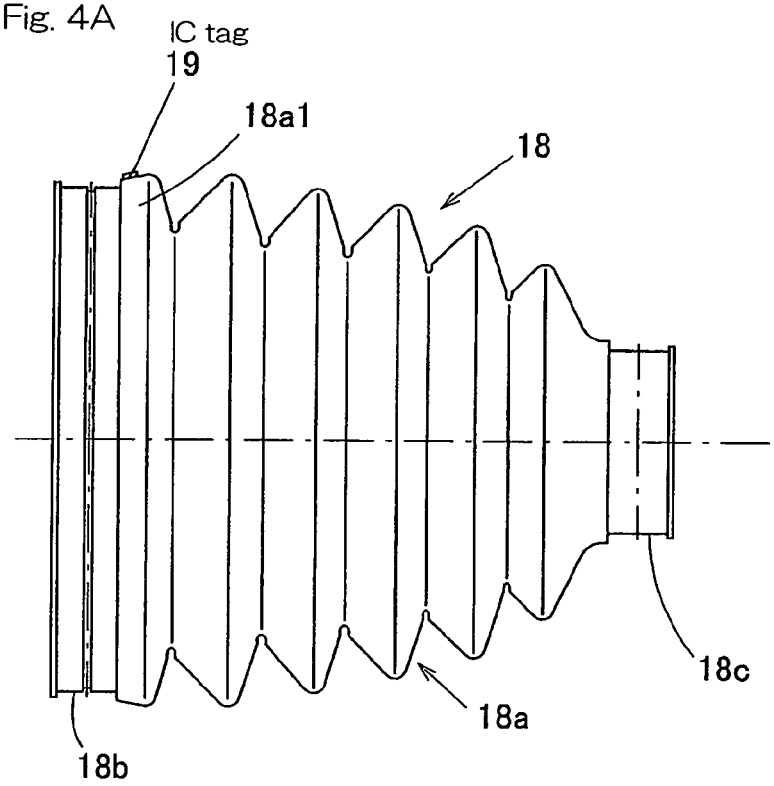
FIG. 4A is an enlarged front view of a boot of the fixed type constant velocity universal joint.

FIGS. 4 and 5 illustrate respective examples, in which the IC tags 9 are attached to the corresponding boots 18 in the fixed type constant velocity universal joint 13 and the sliding type constant velocity universal joint 13A. Where the IC tag 9 is attached to the respective boot 18, it is preferred that the IC tag 9 be attached to an outer diametric portion 18a1 of the associated bellows 18a adjacent the large diameter side open end 18b thereof.

Since the bellows 18a has a major portion thereof, which undergoes extending and bending motions repeatedly, it is not so feasible to attach the IC tag 9 to the major portion of the bellows 18a from the viewpoint of attachment security. Also, since respective outer peripheries of the fixing portions (the large and small diameter open ends) 18b and 18c are utilized as the positions, at which the metallic bands 19A and 19B (FIGS. 2 and 3) are fastened, respectively, and are therefore concealed, communication is difficult. However, the outer diametric portion 18a1 of the bellows 18a adjacent the large diameter side fixing portion 18b is where they will not be adversely affected by the bending motion of the constant velocity universal joints 13 or 13A, attaching the IC tag 9 to this site is effective to achieve a firm fixture enough to avoid a possible separation of the IC tag for a long time regardless of the repeatedly occurring bending motion.

Figure 4B:
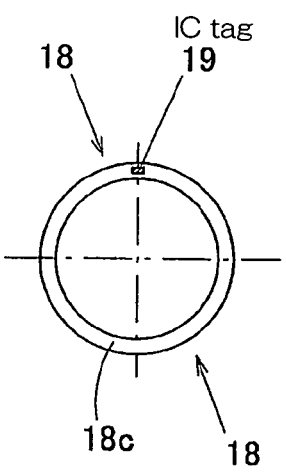
FIG. 4B is a end view of the fixed type constant velocity universal joint.

As shown in FIGS. 4B and 5B, the IC tag 9 may be attached to an end face of the small diameter side fixing portion 18c of the respective boot 18. Alternatively, the IC tag 9 may be attached to an end face of the large diameter side fixing portion 18b. Since those end faces of the fixing portions 18b and 18c are where they will not be adversely affected by the bending motion of the constant velocity universal joints 13 and 13A, respectively, attaching the IC tag 9 to this site is effective to achieve a firm fixture enough to avoid a possible separation of the IC tag for a long time regardless of the repeatedly occurring bending motion.

Where the IC tag 9 is attached to the boot 18, the attachment of the IC tag 9 may be accomplished by attaching the IC tag 9 to a surface of the boot 18 or by embedding the IC tag 9 in the boot 18 by means of, for example, an insert molding technique.

Figure 7A:
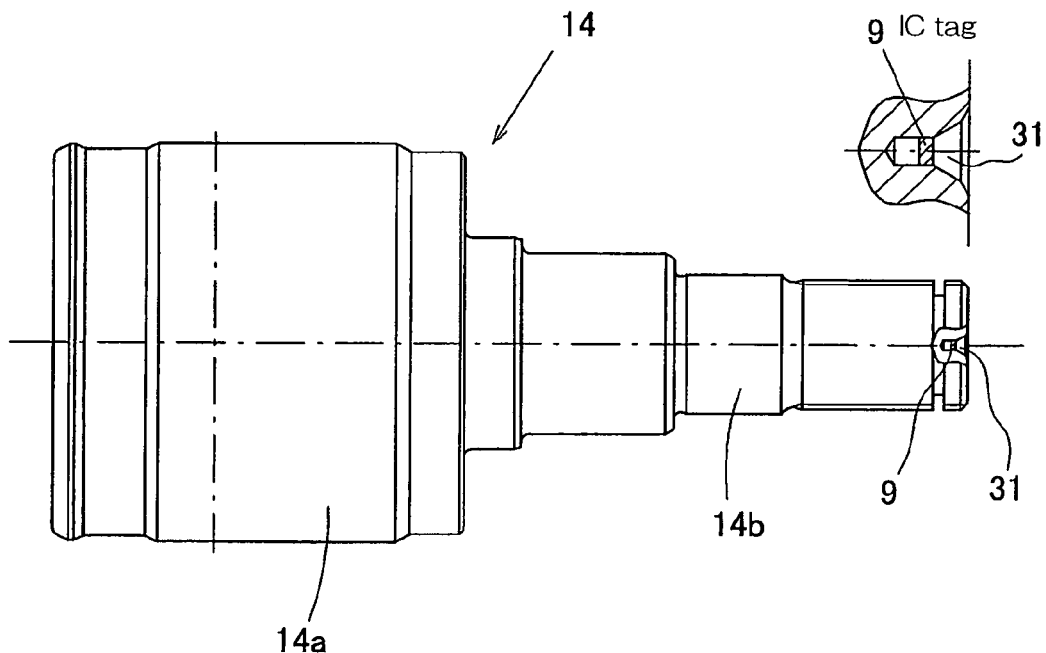
FIG. 7A is an enlarged front view of an outer race of the sliding type constant velocity universal joint.
Figure 7B:
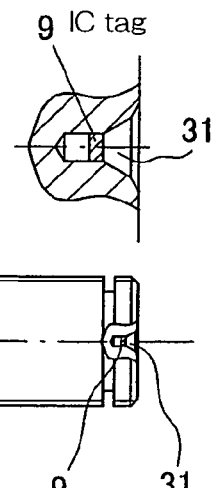
FIG. 7B is a fragmentary enlarged view of a portion of the outer race shown in FIG. 7A.

FIGS. 6 and 7 illustrate respective examples, in which the IC tags 9 are attached to corresponding outer races 14 in the fixed type constant velocity universal joint 13 and the sliding type constant velocity universal joint 13A. In those examples, the IC tag 9 is fitted within a recess 31 provided in an end face of the stem shaft 14b. The recess 31 is provided for the center support when the outer race 14 is to be turned or ground.

This recess 31 will become good for nothing when each of the constant velocity universal joints 13 and 13A is completed, but when this recess 31 is utilized for the IC tag 9 to be attached thereto, the IC tag 9 can be installed as embedded therein without the necessity of a special processing to form a recess.

Figure 8:
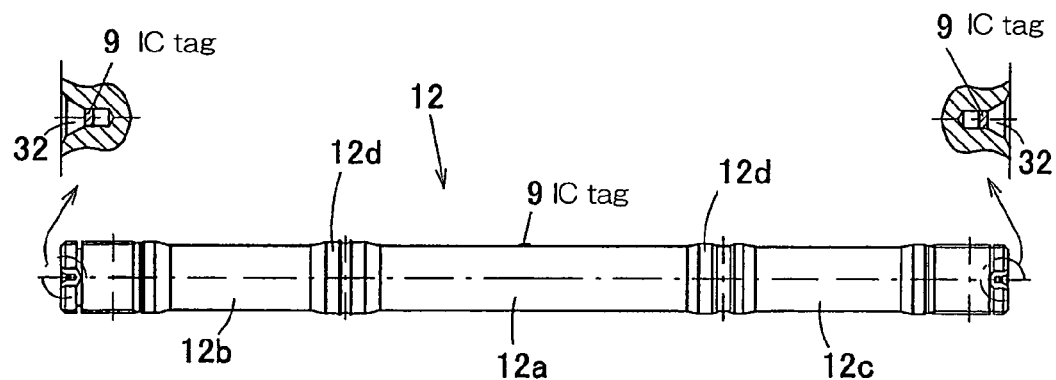
FIG. 8 is an enlarged front view and a fragmentary enlarged view of an intermediate shaft of an automotive vehicle drive shaft.

FIG. 8 illustrates an example, in which the IC tag 9 is attached to the intermediate shaft 12. Where the IC tag 9 is attached to the intermediate shaft 12, the IC tag 9 may be attached within a recess 32 provided in an end face of the intermediate shaft 12.

Figure 9:
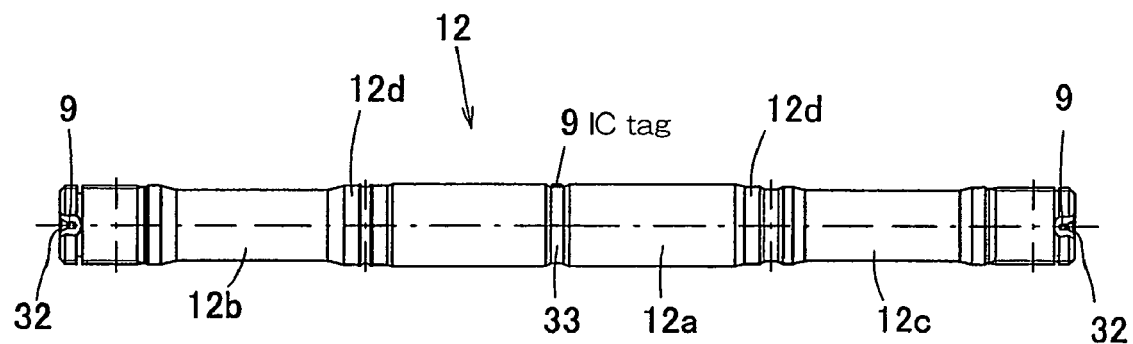
FIG. 9 is an enlarged front view and a fragmentary enlarged view of another example of the intermediate shaft of the automotive vehicle drive shaft.

Even in the intermediate shaft 12, the recess 32 is often provided for the center support when the outer race 14 is to be turned or ground. When this recess 31 is utilized for the IC tag 9 to be attached thereto, the IC tag 9 can be installed as embedded therein without the necessity of a special processing.

Where the IC tag 9 is attached to the intermediate shaft 12, it may be attached to an outer peripheral surface of a shank intermediate portion 12a of the intermediate shaft 12. The intermediate shaft 12 is available in two types, in which the shank intermediate portion 12a has the same diameter as that of any one of shank end portions 12b and 12c on opposite ends thereof as represented by an example shown in FIG. 8 and in which the shank intermediate portion 12a has a diameter greater than that of any one of the shank end portions 12b and 12c on opposite sides thereof as represented by an example shown in FIG. 9. For the material of the intermediate shaft 12, a material of a diameter greater than the diameter required is employed for the formation of the boot seats 12d on opposite sides and, although the shank end portions 12b and 12c are processed by means of, for example, turning, to the required diameter, that is why there are two cases, in which the shank intermediate portion 12a is required to have a thickness substantially equal to that of the material or is required to be processed to the required diameter, respectively.

Where as represented by the example shown in FIG. 8, the shank intermediate portion 12a is slimly processed, the IC tag 9 is attached to an outer periphery of the shank intermediate portion 12a.

Where as represented by the example shown in FIG. 9, the shank intermediate portion 12a is rendered to have a diameter greater than that of any one of the shank end portions 12b and 12c, a mounting groove 33 is provided in an outer periphery of the shank intermediate portion 12a and the IC tag 9 may be attached within this mounting groove 33. In this intermediate shaft 12, the shank intermediate portion 12a is a portion which is excessive in terms of strength and if the IC tag is fitted within the mounting groove 33 provided in this portion, the IC tag 9 can be attached as embedded without incurring any problem associated with reduction in strength of the intermediate shaft 12.

Also, in the vehicle drive shaft 11, if the IC tag 9 is attached to the shank intermediate portion 12a of the intermediate shaft 12, the ambient space is so large as to enable communication with the IC tag 9.

Figure 15:
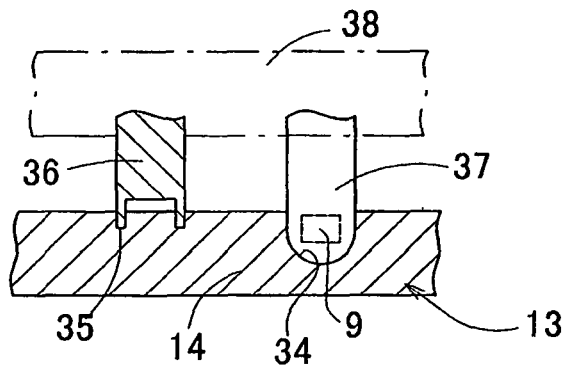
FIG. 15 is an explanatory diagram showing the manner of embossing an element of the constant velocity universal joint.

The IC tag 9 attached in the manner described hereinabove is recorded with information on the constant velocity universal joints 13 and 13A, but may be recorded with information on the vehicle drive shaft 11.

Where the IC tag 9 is attached to each of the constant velocity universal joints 13 and 13A, at least one of the elements including, for example, the outer race 14, the inner race 15 and the retainer 16, all forming the constant velocity universal joints 13 and 13A, may be applied an engraved marking 35 (FIG. 15) representative of letters or symbols, a mounting recess 34 may be formed at a location adjacent the engraved marking 35 by means of an embossing technique and the IC tag 9 may then be fitted within this mounting recess 34. In such case, as shown in FIG. 15, formation of the engraved marking 35 of letters or the like and formation of the mounting recess 34 are carried out simultaneously by tools 36 and 37, used for the embossing work, fitted to the same tool holder 38. The engraved marking 35 may be applied to, for example, an outer peripheral surface of the outer race 14 or an end face of the stem shaft 14b thereof.

The engraved marking 35 is descriptive of information such as the manufacturer's name and the lot number and may be dispensed with when the IC tag 9 is attached, but for visual determination by a person, there is a case in which the concurrent use of the engraved marking 35 with the IC tag 9 is preferred. If during the formation of the engraved marking 35, the mounting recess 34 for the IC tag 9 is concurrently formed by engraving, the IC tag 9 can be attached as embedded without increasing the number of processing steps required to form the mounting recess 34.

FIG. 10 illustrates a manufacturing process of making the fixed type constant velocity universal joint 13 shown in FIG. 2. The outer race 14, the inner race 15 and the retainer 17, all forming the constant velocity universal joint 13, are manufactured in respective manners as shown in FIGS. 10A to 10C. Each of the outer race 14, the inner race 15 and the retainer 16 includes, as a schematic process division, a step of material purchase, a forging step S2 (Although in the appended claims, this step is referred to as a forging and turning step, it is referred to as a forging step for short.) during which at least one of forging and turning is carried out, a heat treatment step S3 and a grinding step S4.

In the case of the outer race 14, during the forging step S2, forging, turning and spline-thread rolling are sequentially performed. During the heat treatment step S3, a high frequency heat treatment is carried out.

In the case of the inner race 15, during the forging step S2, forging, turning and spline broaching are sequentially carried out. During the heat treatment step S3, a carburization, for example, is carried out.

In the case of the retainer 17, during the forging step S2, pipe cutting, turning, window-forming press, shaping and so on are carried out. During the heat treatment step S3, a carburization, for example, is carried out.

The process of manufacturing balls 16, although illustration of which is omitted, includes a forging step (S2) including a stamping, brushing and green grinding, a heat treatment step (S3) and a grinding step (S4).

The elements so manufactured in the manner described above are assembled in the manner as shown in FIG. 10D. First, (a) the retainer and the inner race 15 are combined to form a cassette, then (b) the cassette is inserted into the outer race 14, (c) the balls are inserted into the retainer and finally (d) grease is filled.

FIGS. 11A to 11D illustrate the manner of manufacture of the sliding type constant velocity universal joint 13A, but since it is substantially identical with that for the fixed type constant velocity universal joint 13, the explanation thereof are omitted.

Figure 12A:
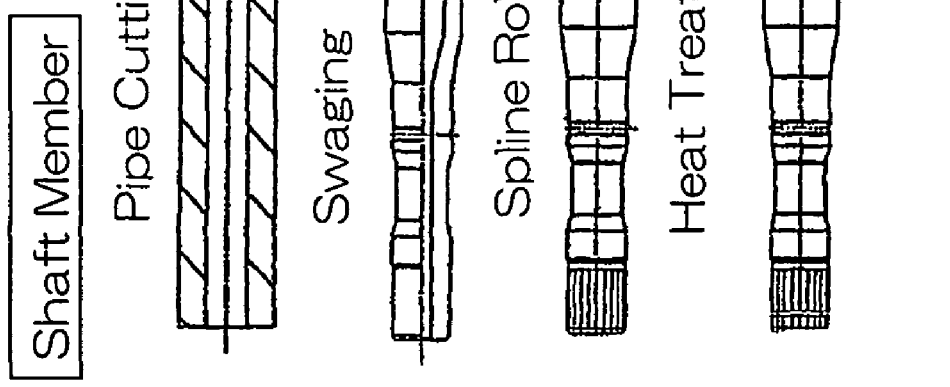
FIG. 12A is an explanatory diagram showing one of processes of manufacturing the intermediate shaft of the automotive vehicle drive shaft.
Figure 12B:
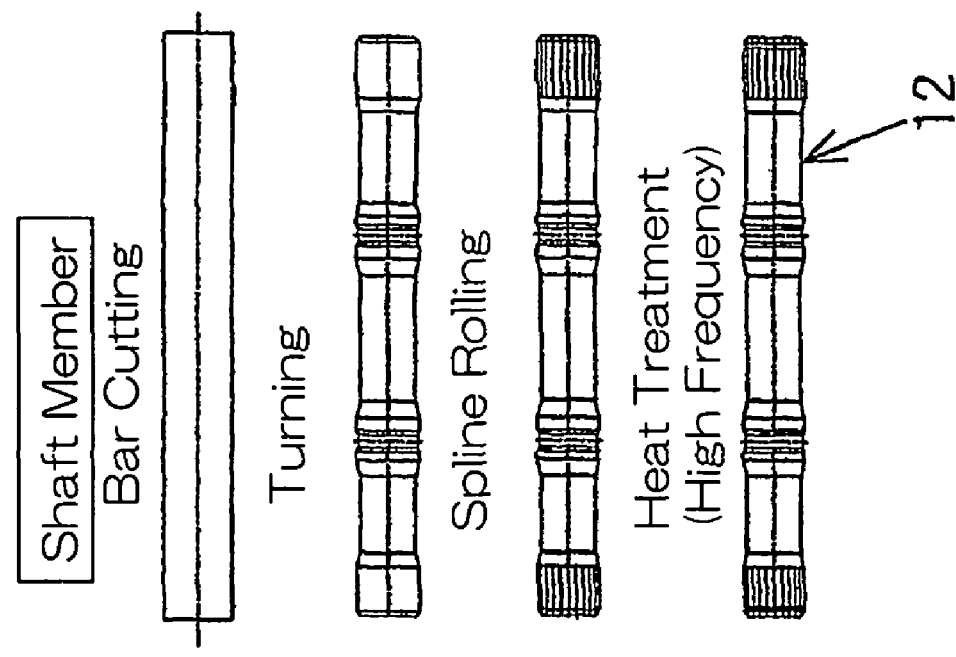
FIG. 12B is an explanatory diagram showing the other of the processes of manufacturing the intermediate shaft of the automotive vehicle drive shaft.

FIGS. 12A and 12B illustrate the process of manufacturing the intermediate shaft 12, showing the example, in which a bar member is used as a raw material, and the example, in which a pipe member is used as a raw material, respectively.

In the example shown in FIG. 12A, the bar member is cut to a predetermined length, turned, spline-rolled and heat treated.

In the example shown in FIG. 12B, the pipe member is cut to a predetermined length, swaged, spline-rolled and heat treated.

FIGS. 13A to 13H illustrate an example of an assembling process for assembling the constant velocity universal joints 13 and 13A, which are manufactured in the manner described hereinabove, on the vehicle drive shaft 11.

A small round grip is press fitted onto the intermediate shaft 12 (FIG. 13A), and the intermediate shaft 12 is inserted into the inner race 15 (FIG. 2) of the constant velocity universal joint 13 (FIG. 13B). The boot 18 of the constant velocity universal joint 13, two small bands and the boot 18 for the sliding type constant velocity universal joint 13A are passed over the intermediate shaft 12 (FIG. 13C). The cassette including the inner race 15 and the retainer 17 of the sliding type constant velocity universal joint 13A is passed over the shank 12, a snap ring is incorporated, and a grease is filled in the boots 18 (FIG. 13D). After the grease has been filled in the outer race 14 of the sliding type constant velocity universal joint 13A, a large round grip is mounted onto the outer race 14 (FIG. 13E), the boots 18 are covered on the respective outer races 14 and the small bands and the large bands are fastened around the respective boots 18 (FIG. 13F). A small round grip is mounted over the outer race 14 of the sliding type constant velocity universal joint 13A (FIG. 13G) and, finally, a dust cover is press fitted over the outer race 14.

Figure 16:
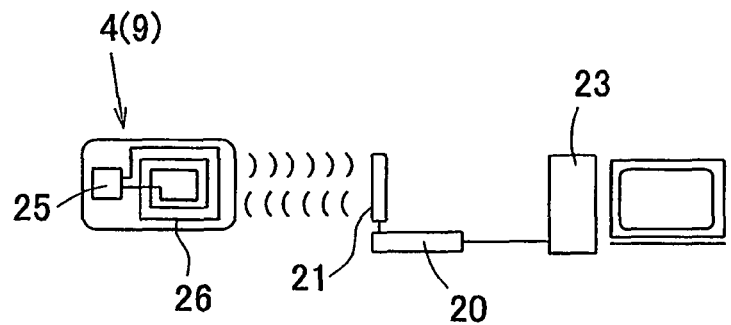
FIG. 16 is an explanatory diagram showing the relation between the IC tag and a tag reader/writer.

An example of the IC tag 9, which is employed in this embodiment, will now be described with particular reference to FIGS. 16 and 17. It is to be noted that the IC tag 4, described later, is similar to this IC tag 9. Recording and reading of information in and from the IC tags 4 and 9 are carried out by the use of a tag reader/writer 20. The tag reader/writer 20 includes an antenna 21 that is directed towards the IC tags 4 and 9. The tag reader/writer 20 is controlled by an information processor 23 such as a computer. When only reading of the information from the IC tags 4 and 9 is necessary, a tag reader having only a reading capability may be employed in place of the tag reader/writer 20.

The IC tags 4 and 9 are of a type capable of information reading on a non-contact basis and are each made up of an IC chip (a chip of an integrated circuit) 25 and an antenna 26. The IC chip 25 and the antenna 26 are integrally encapsulated by a resin (not shown).

The IC tag is available in various types, shapes and sizes and may be rectangular or plate-like as well as squared or spherical of a size smaller than, for example, 1 mm and has a varying storage capacity, but the IC tag may be properly selected in dependence on the type of an object to which it is fitted and in dependence on the size of the object. Since the IC tag 4 used for the control of the element 2 as will be described later is attached to a container 61 or the like (FIGS. 22 and 23), it may be of a relatively large size, but the IC tag 9, which is fitted to the constant velocity universal joints 13 and 13A, is preferably of a small size. For the IC tags 4 and 9, an RFID based IC tag, that utilizes the RFID (Radio Frequency Identification) technology, can be utilized. The RFID based IC tag is available in various types utilizing electrostatic coupling, electromagnetic coupling, electromagnetic induction, microwaves and light for a transmission system and, of them, any type can be employed, but by way of example, the IC tag of an electromagnetic induction type can be employed.

The IC tag of a kind that can be utilized even in the presence of a metal nearby is available. In the case where the IC tag is attached to the constant velocity universal joints 13 and 13A and, in particular, where the IC tag is attached to a location other than the boots 18, such IC tag operable in the presence of a metal is preferred.

Figure 17:
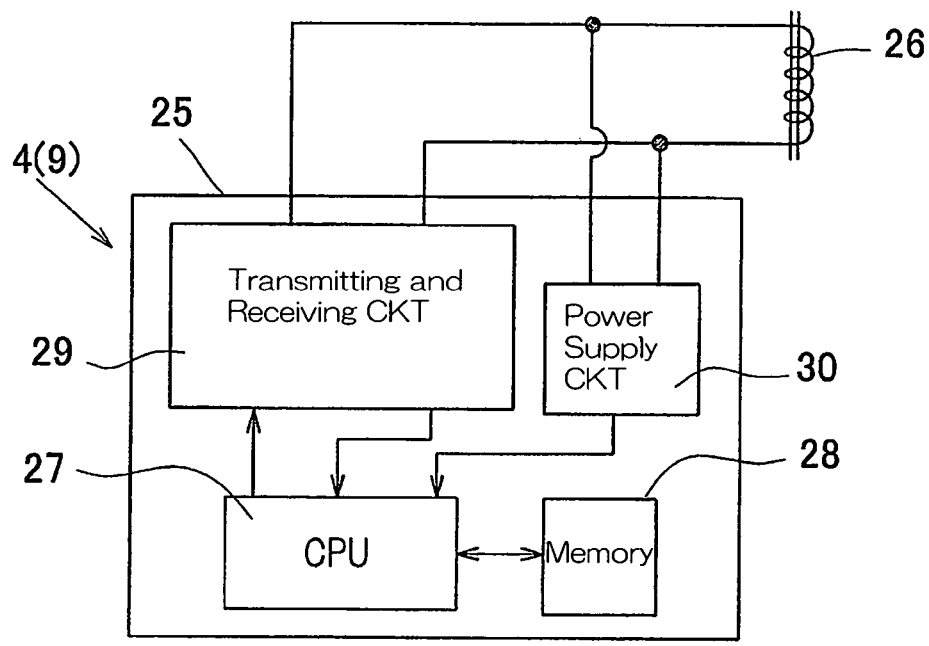
FIG. 17 is a circuit diagram of the IC tag.

FIG. 17 illustrates a specific example of a circuit of each of the IC tags 4 and 9. The IC chip 25 employed in each of the IC tags 4 and 9 includes a central processing unit (CPU) 27, a memory 28, a transmitting and receiving circuit 29 and an electric power supply circuit 30. The electric power supply circuit 30 is of a type capable of acquiring an electric power from an antenna 26. The memory 28 is one that does not require an electric power source for the storage of information.

The IC tags 9 attached to the constant velocity universal joints 13 and 13A are used for the control of the identification information and the manufacturing information as described hereinbefore, but may be recorded with the status-of-use information associated with the use of the constant velocity universal joints 13 and 13A. The status-of-use information that is recorded in the IC tag 9 includes the total number of revolutions, the maximum number of revolutions, the temperature, the torque and so on and at least one of them is preferably recorded in the IC tag 9. The total number of revolutions may be, in the case of an automotive vehicle, information on the travel distance.

When the status-of-use information is stored in the IC tag 9 attached to the constant velocity universal joints 13 and 13A, information on the status of actual use of the constant velocity universal joints 13 and 13A can be read out subsequently for confirmation. Since the IC tag 9 capable of a contactless communication is employed, reading and writing of the information on the status-of-use can be accomplished easily.

Figure 19:
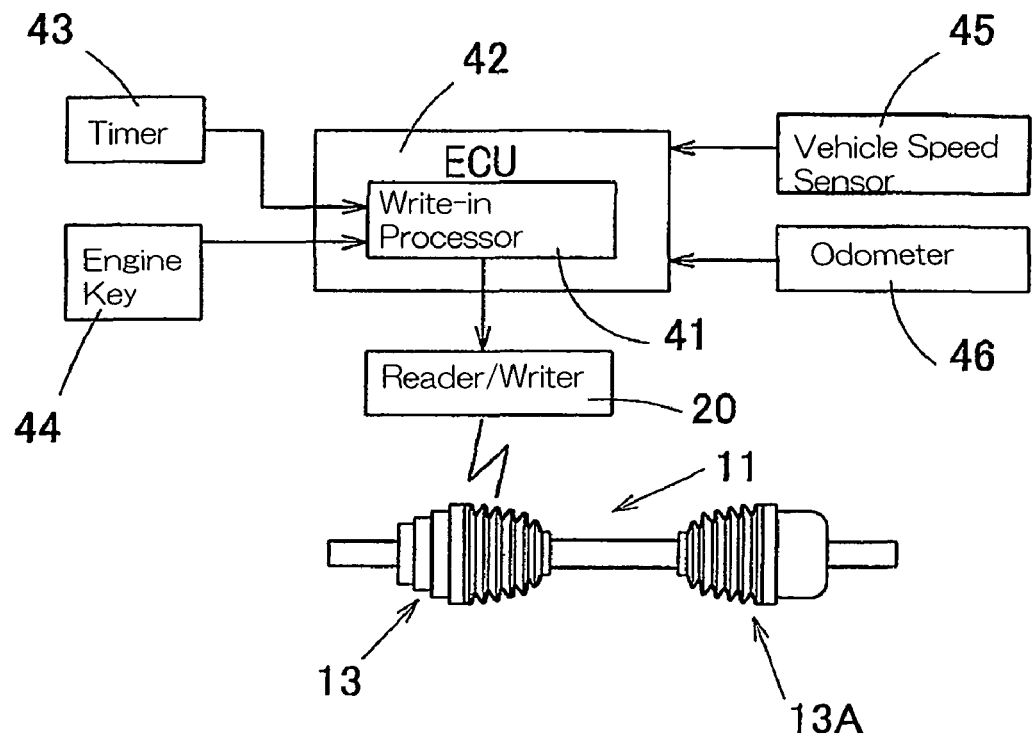
FIG. 19 is a block diagram showing the relation between the IC tag in the automotive vehicle drive shaft and a write-in processor operable therewith.
Figure 20:
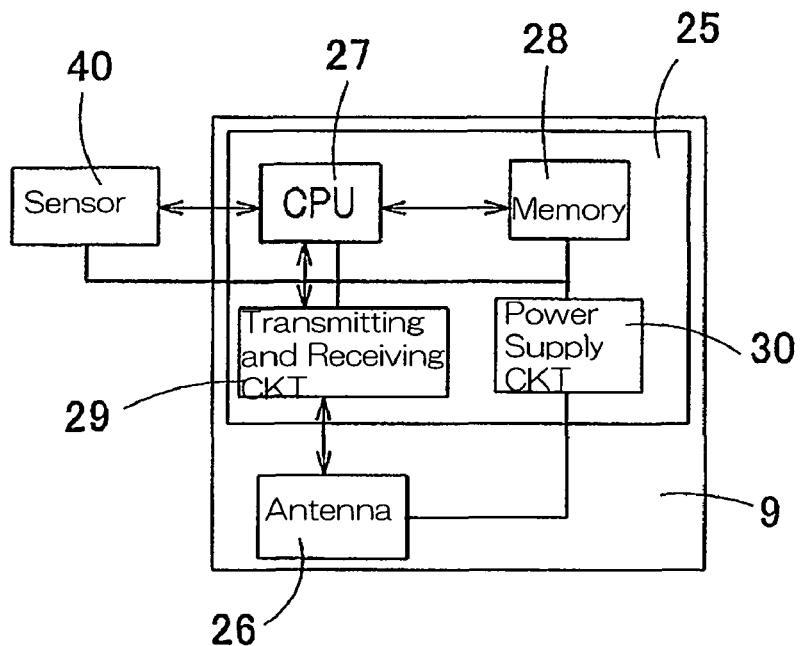
FIG. 20 is a block diagram showing the IC tag and a sensor connected with such IC tag.

As hereinbefore described with reference to FIG. 1, the constant velocity universal joints 13 and 13A may be of a type forming respective parts of the vehicle drive shaft 11. In such case, as shown in FIG. 19, while the reader/writer 20 capable of communicating with the IC tag 9 and a write-in processor 41 for writing predetermined information in the IC tag 9 through this reader/writer 20 are mounted on the automotive vehicle, the status-of-use referred to above may be recorded in the IC tag 9 through the write-in processor 41. The write-in processor 41 may be provided in, for example, an electric control unit (ECU) 42 for controlling the entirety of the automotive vehicle.

Although the IC tag 9 generally requires no electric power source for the storage of information, writing and reading of the information in the IC tag 9 require the use of the reader/writer 20. With the reader/writer 20 and the write-in processor 41 mounted on the automotive vehicle, writing of information on the status-of-use of the constant velocity universal joints 13 and 13A can be automatically accomplished without requiring a vehicle driver to manipulate.

In such case, the write-in processor 41 may have a function of regularly recording the status-of-use. The regular recording may be carried out at predetermined intervals of time such as, for example, once a day or at the time when a condition is satisfied other than time such as, for example, each time a key of the automotive vehicle is turned on. In order for the recording to be carried out at predetermined intervals of time, the write-in processor 41 performs a writing operation at a timing determined by a timer 43. Also, if the writing operation of the write-in processor 41 is initiated in response to the turn-on of an engine key 44, the writing can be carried out each time the key is turned on.

By those procedures, recording of information on the status-of-use of the constant velocity universal joint in the IC tag can be accomplished assuredly without being forgotten or performed arbitrarily.

The write-in processor 41 may be so designed as to record one or both of the travel distance and the maximum speed as the information on the status-of-use. Recording of the travel distance and the maximum speed may be accomplished by way of updating the contents recorded in the IC tag 9. Information on the travel distance and the maximum speed corresponds to information on the total number of revolutions and the maximum number of revolutions of each of the constant velocity universal joints 13 and 13A.

The travel distance and the maximum speed can be discerned from respective detection values of a vehicle velocity sensor 45 and an odometer 46, which are inputted to the electric control unit (ECU) 42. If the travel distance and the maximum speed are recorded in the IC tags 9 attached to the constant velocity universal joints 13 and 13A, the records on the constant velocity universal joints 13 and 13A can be obtained. Although the storage capacity of the IC tag 9 decreases when the IC tag 9 is compactized, recording of the travel distance and the maximum speed in the form as updated is effective to avoid a shortage of the storage capacity.

Where the IC tags 9 attached to the constant velocity universal joints 13 and 13A, respectively, are used for controlling the status of actual use subsequent to shipment, a sensor for detecting an object to be detected of the constant velocity universal joints 13 and 13A may be connected with the IC tag 9. In such case, the sensor 40 may be integrated on a chip or a substrate or the like together with the IC tag 9. For the sensor 40, a temperature sensor or a strain gauge, for example, can be used.

If the sensor 40 is connected so that the detected information can be recorded in the IC tag 9, it is possible to record the status-of-use information such as the temperature of the constant velocity universal joints 13 and 13A and a loaded torque acting on them.

Since the constant velocity universal joints 13 and 13A emit heat in an amount that depends on the condition of use, knowing the temperature of the constant velocity universal joints 13, 13A is convenient in control of the status-of-use of the constant velocity universal joints 13, 13A. Also, if the constant velocity universal joints 13, 13A are used under an unreasonably loaded condition, an abnormal torque tends to be generated and, accordingly, if the torque is also recorded, it is convenient for servicing or diagnosis.

Another item, which can be preferably stored in the IC tag 9 with the use of the sensors 40 provided in the constant velocity universal joints 13 and 13A, includes an axial tension and a bending moment acting on the intermediate shaft 12 of the vehicle drive shaft 11. The bending moment affects excitation of the intermediate shaft 12 and can be used for clarification of the status of generation of a whining sound perceived within a vehicle compartment during the run of the automotive vehicle. For the detection of the bending moment, the sensor is employed in the form of a strain gauge. Other than this, in the case of the sliding type constant velocity universal joint 13A (FIG. 4) or 13B (FIG. 14), if an induced thrust force or a slide resistance, which is generated when the rotation is transmitted while an operating angle is resumed, is detected by a sensor and is then recorded in the IC tag 9, it can be used for the determination of the durability at which a favorable operation of the constant velocity universal joints 13 and 13A can be obtained.

Figure 21:
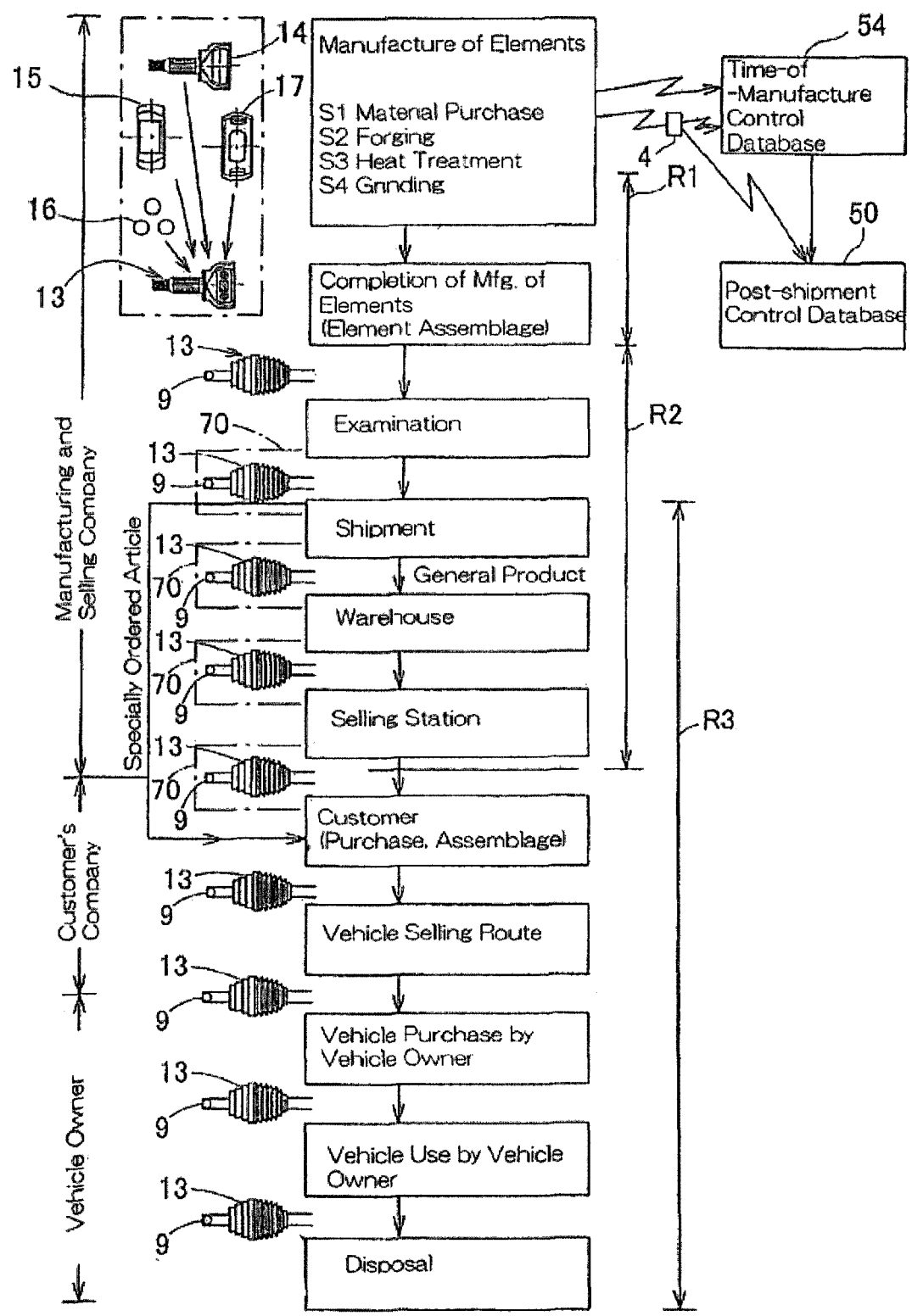
FIG. 21 is an explanatory diagram showing a quality control method for the constant velocity universal joint according to the first preferred embodiment of the present invention.

FIG. 21 illustrates a series of stages of flow of the constant velocity universal joint 13 from the manufacture thereof to the disposal thereof and quality control steps, in which the IC tag 9 is utilized at each of those flow stages. The sliding type constant velocity universal joint 13A is also controlled in a manner similar to the fixed type constant velocity universal joint 13. The quality control method for this shaft joint is a method in which the IC tag 9 is attached to the constant velocity universal joint 13, a predetermined manufacturing information ranging from purchase of material to examination through a forging step, a heat treatment step and a grinding step, all associated with the constant velocity universal joint 13, is recorded in the IC tag 9, and from the recorded information read out from the IC tag 9, traceability associated with the quality control of the constant velocity universal joint 13 is enabled. Even where a different method of purchase of material is employed in place of the purchase of the material, a control similar to that during the purchase of the material is carried out. The forging step may include a substep of turning subsequent to the forging or, without the forging step, turning may be carried out on the raw material. Although in the appended claims, it is referred to as "forging and turning step", it is simply referred to as "forging step" in this specification. The IC tag 9 is of a type in or from which information can be recorded or read out, respectively, on a non-contact basis.

Also, in the description that follows, unless otherwise specified, the elements such as the outer race 14, the inner race 15, the balls 16, the retainers 17, the intermediate shaft 12 and the boots 18, all forming respective parts of the constant velocity universal joint 13, are collectively designated by a reference numeral "2".

This quality control method for the shaft joint includes an IC tag attaching step R1, a manufacturing information recording step R2 and a recorded information reading and utilizing step R3.

(IC Tag Attaching Step R1)

During this step, the IC tag 9 is attached to the constant velocity universal joint 13 at the time of manufacture of, or at the time of completion of the manufacture of, the constant velocity universal joint 13. In such case, after the IC tag 9 has been attached to one of the elements 2 such as the outer race 14, the intermediate shaft 12 or the boots 18, all forming respective parts of the constant velocity universal joint 13, the constant velocity universal joint 13 may be assembled, or alternatively, the IC tag 9 may be attached to the constant velocity universal joint 13 after the assemblage of the constant velocity universal joint 13 completes.

(Manufacturing Information Recording Step R2)

During this step, a predetermined manufacturing information ranging from the purchase of material to the examination by way of the forging step, the heat treatment step and the grinding step, all associated with the constant velocity universal joint 13, is recorded in the IC tag 9, attached to this constant velocity universal joint 13, by the time the constant velocity universal joint is shipped or delivered to a customer. The manufacturing information recorded in this way includes a processing condition information on at least one of the forging, heat treatment and grinding steps. The purchase of material, the forging step, the heat treatment step and the grinding step, all associated with the constant velocity universal joint 13, are nothing other than the purchase of material, the forging step, the heat treatment step and the grinding step, all associated with any of the elements 2 forming the constant velocity universal joint 13. The processing condition information includes, for example, the press pressure, the cycle time and other parameters, so long as the forging step is concerned; the heat treatment temperature, the heating time and the heating method and other parameters, so long as the heat treatment step is concerned; and the rotational speed of a grinding stone, the cutting speed, the feed speed and other parameters, so long as the grinding step is concerned. In addition to the processing condition information referred to above, the manufacturing information preferably includes at least one of pieces of information concerning the date of manufacture of the constant velocity universal joint 13, the place of manufacture of the constant velocity universal joint 13, the brand of the grease employed therein, the gap size between the elements employed, the term of warranty and handling cautions. Also, information on various results of examination is also preferably included in the manufacturing information. Those results of examination may include results of examination on each of the elements 2 and results of examination of the complete constant velocity universal joint 13. Again, other than those pieces of information, the manufacturing information may additionally include a piece of information on identification of the constant velocity universal joint 13. The identification information on the constant velocity universal joint 13 may include information on identification unique to each of the constant velocity universal joint 13, for example, the manufacturer's serial number and/or information on identification specific to a particular lot of the constant velocity universal joints 13, for example, the lot number. Recording of those pieces of manufacturing information may be carried out all at a time or on a piecemeal basis. By way of example, when assemblage of the constant velocity universal joint 13 completes and the complete product is subsequently examined, some of those pieces of information, which are associated with the results of examination and examining conditions, may be recorded, while the remaining pieces of information may be recorded subsequently, or all of those pieces of information may be recorded all at a time.

(Information Reading and Utilizing Step R3)

This step is such that at an arbitrarily chosen time subsequent to the shipment, the information recorded in the IC tag 9 is read out and at least the processing condition information is then confirmed from the information so read out.

The flow of the constant velocity universal joint 13 from completion of the manufacture to disposal generally includes, as shown in FIG. 21, completion of assemblage of the constant velocity universal joint 13 to the disposal thereof by way of examination of the complete product, shipment, storage in a warehouse, storage at business premises, delivery to a customer (inclusive of customer's purchase and incorporation of the constant velocity universal joint into the automotive vehicle), an automobile sales route in the customer or the automobile dealer (or an automobile leasing route), purchase and use of the automotive vehicle by the customer and disposal. In the case of a specially ordered article, it is delivered directly to a customer immediately after the shipment.

In the case of the constant velocity universal joint 13 for use in mechanical equipments, as shown in the flow shown of FIG. 21, subsequent to the purchase by a customer, assemblage into a customer's machine and use thereof are carried out, followed by the disposal.

Reading and utilization of the information recorded on the IC tag 9 takes place at any arbitrarily chosen time subsequent to the shipment, depending on the necessity and some of the pieces of the information so read out from the IC tag 9 are then confirmed.

Figure 18:
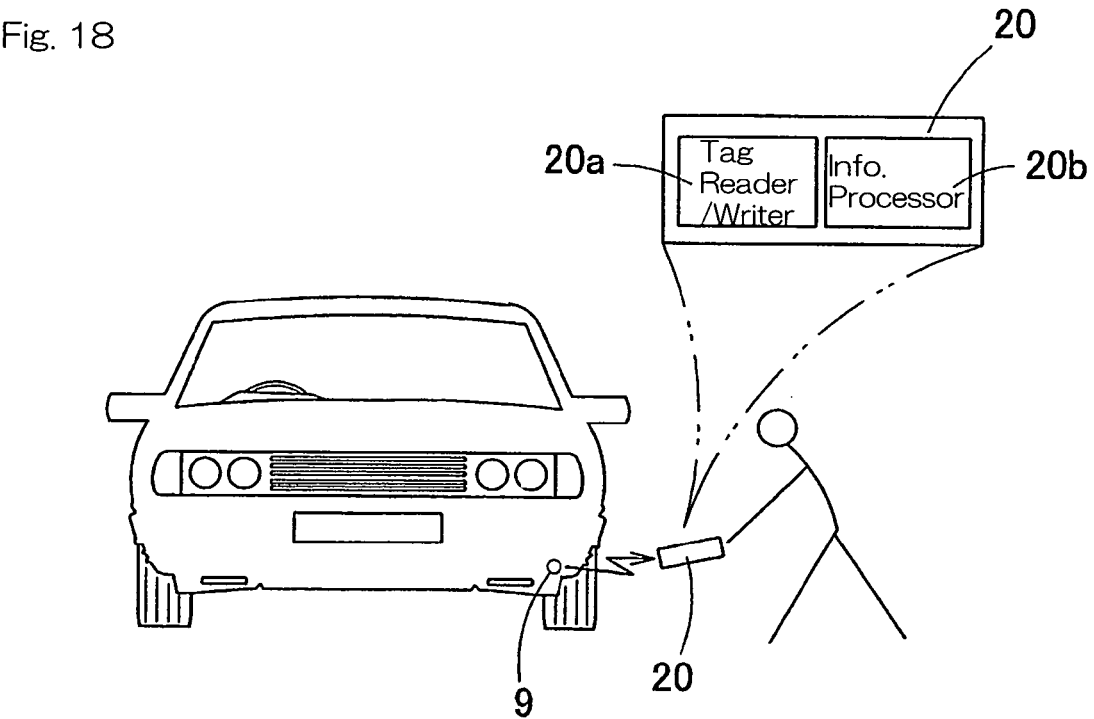
FIG. 18 is an explanatory diagram showing an example of reading contents stored in the IC tag with the use of a tag reader in relation to the constant velocity universal joint that is assembled in the automotive vehicle.

When reading of the information recorded in the IC tag 9 is to be carried out, the reading of the information from the IC tag 9 can be accomplished by, for example, bringing the tag reader/writer 20 close to the automotive vehicle, as shown in FIG. 18, while the constant velocity universal joint 13 mounted on the automotive vehicle remains as mounted thereon. Because of this, the information on the constant velocity universal joint 13 can be simply and quickly made available.

By way of example, the information read out from the IC tag 9 may be outputted to the information processor 20b provided in the tag reader/writer 20. In the example shown in FIG. 18, the tag reader/writer 20 is of a portable type and is of a type including a tag reader/writer unit 20a and the information processor 20b. The tag reader/writer 20 may be a tag reader having only a reading capability.

Referring to FIG. 21, as an additional utilization during the information reading and utilizing step R3, a free storage space of the memory in the IC tag 9 attached to the constant velocity universal joint 13 is utilized suitably for storing information on, for example, shipment control, inventory control, distribution control and/or maintenance control. Also, it is used for storing information on control of the status-of-use of the constant velocity universal joint 12 such as, for example, the maximum number of revolutions. It is to be noted that the IC tag 9 for the control of the status-of-use may be provided separate from the IC tag 9 for the control of the manufacturing information.

According to this quality control method for the constant velocity universal joint, one of the pieces of the processing condition information including the forging step, the heat treatment step, the grinding step and others can be confirmed during the information reading and utilizing step R3 taking place at any desired time subsequent to the shipment. Because of this, even in the constant velocity universal joint 13, which is required to have a severe quality and precision, it is possible to solve, for example, a technical problem occurring in the constant velocity universal joint 13. Also, in the case of this method, since the information can be controlled only by the IC tag 9 with no need to use any separate database, the processing condition information can be read out in the facilities, where the processing condition information is desired to be confirmed, from the IC tag 9 regardless of the use of communication facilities necessary to make access to the database and the access authority.

Although the above described embodiment is a method of conducting the quality control by the use of the recorded information while the pieces of the manufacturing information has been recorded in the IC tag 9 as many as possible, the IC tag 9 may be used in combination with a database 50.

The database 50 is designed to store the predetermined manufacturing information on the flow from the purchase of material to the examination by way of the forging step, the heat treatment step and the grinding step with respect to the constant velocity universal joint 13 in association with the identification information on the constant velocity universal joint 13, so that contents stored in the database 50 can be extracted based on the identification information. The quality control is carried out by the utilization of the database 50 and the IC tag 9 attached to the constant velocity universal joint 13. In such case, during the various steps R1 to R3, the following processing takes place.

(IC Tag Attaching Step R1)

This step R1 is identical with that described in connection with the previous embodiment.

(Manufacturing Information Recording Step R2)

During this step R2, the identification information on the manufacture's serial number, the lot number or the like with respect to the constant velocity universal joint 13 and the manufacturing information on the constant velocity universal joint 13 are recorded on the IC tag 9 attached to the constant velocity universal joint 13, based on the database 50 at the time of shipment or by the time of delivery to a customer. The manufacturing information so recorded includes information on processing conditions of at least one of the forging, heat treatment and grinding steps with respect to each of the elements 2. Since the database 50 is used concurrently with the IC tag 9, the manufacturing information to be recorded on the IC tag 9 may be limited to only information that is convenient to read out directly from the IC tag 9. For example, pieces of information concerning the date of manufacture of the constant velocity universal joint 13, the place of manufacture of the constant velocity universal joint 13, the brand of the grease employed therein, the gap size between the elements 2 employed, the term of warranty and handling cautions are preferably recorded on the IC tag 9.

(Information Reading and Utilizing Step R3)

During this step, at an arbitrarily chosen time subsequent to the shipment, the information recorded on the IC tag 9 is read out and one of confirmation of the purchased material, confirmation of the manufacturing process, confirmation of the processing condition information thereof, confirmation of the result of examination and others is carried out making reference to the information so read out or to information obtained by collating the information so read out with the database 50. Other information recorded on the IC tag 9 and the database 50 may be carried out.

Even in this control method, during the information reading and utilizing step R3 taking place at any desired time subsequent to the shipment, one of the pieces of the processing condition information, such as any of the forging step, the heat treatment step, the grinding step and others, can be confirmed. Because of this, the technical clarification or the like can be carried out easily even in the case of the constant velocity universal joint 13, which is required to have a severe quality and precision. Also, since the IC tag 9 attached to the constant velocity universal joint 13 contains the identification information and, also, the database 50 contains the various pieces of information in correspondence with the identification information, many of the pieces of information can be extracted from the database 50 with no need to rely on the limited storage capacity of the IC tag 9. A free storage space of the memory in the IC tag 9 can be used for the maintenance of the various histories subsequent to the shipment and/or subsequent to the delivery to the customer or the like.

Figure 22:
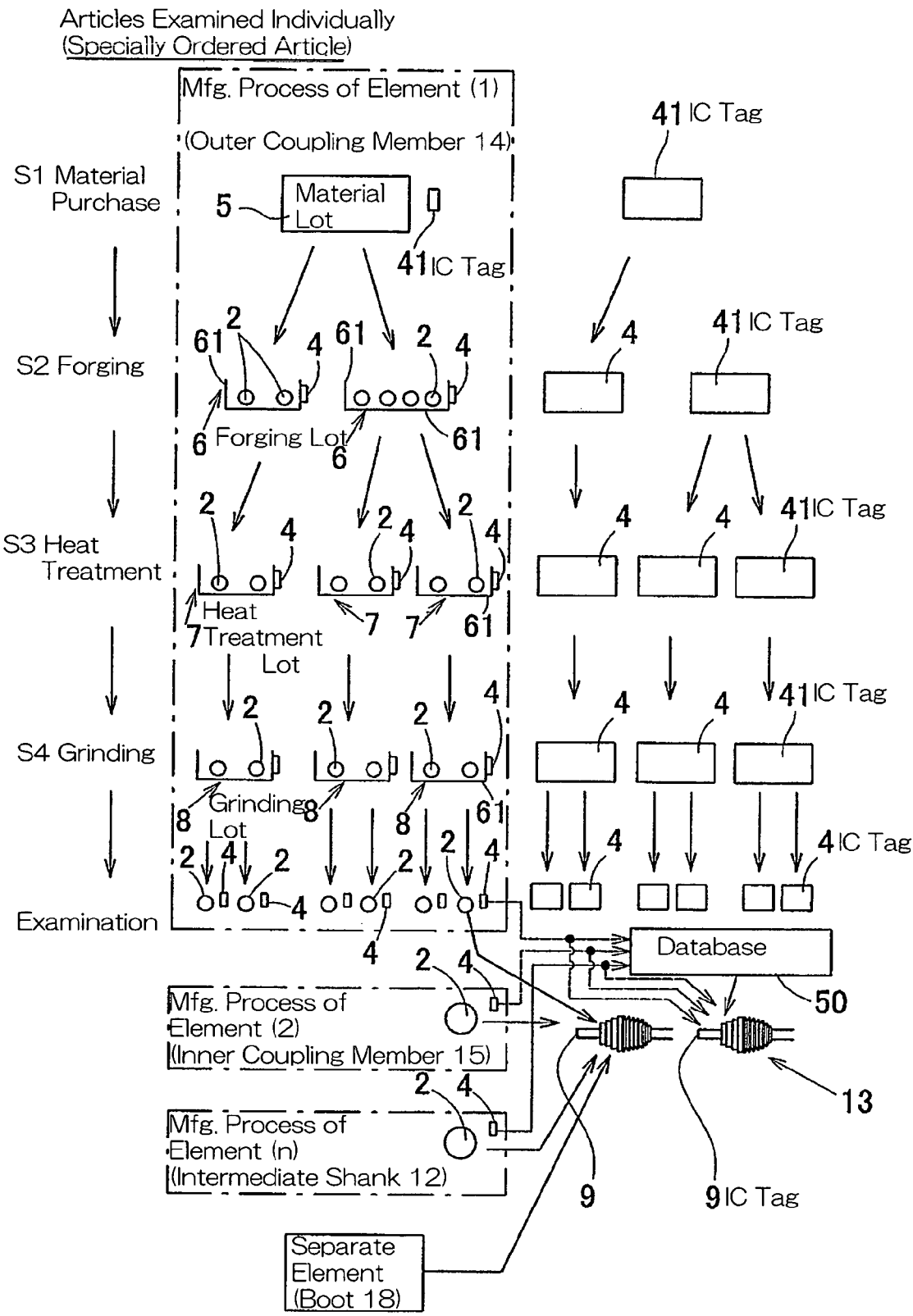
FIG. 22 is an explanatory diagram showing the control of the element in the quality control method for the constant velocity universal joint.

The details of the foregoing control method and the details of the database 50 will be described later with particular reference to FIG. 22 and the subsequent drawings.

In any one of the foregoing embodiments, collection of the various pieces of the manufacturing information to be recorded during the manufacturing information recording step R2 may be carried out by recording them in a time-ofmanufacture control database 54 and subsequently recording them on the IC tag 9 attached to the constant velocity universal joint 13 or, alternatively, on a different IC tag 4 for use during the manufacture, which is different from the IC tag 9 attached to the constant velocity universal joint 13.

A method of recording in the time-of-manufacture control database 54 includes a step of recording in the time-of-manufacture control database 54, the manufacturing information on the manufacturing process including the purchase of material, the forging step, the heat treatment step, the grinding step and the examination step with respect to the elements 2 of the constant velocity universal joint 13, in association with the lot number of the elements 2 or the identification number for each of the elements 2, and a step of recording the information so recorded in the IC tag attached to the constant velocity universal joint 13. It is to be noted that the time-of-manufacture control database 54 is provided in one or a plurality of computers (not shown) linked to, for example, a computer network.

While a method of utilizing the IC tag 4 for use during the manufacture will be described later with reference to FIG. 22 and the subsequent drawings, it can be summarized as follows. This method includes a step of recording the manufacturing information on a manufacturing process with respect to the elements 2 of the constant velocity universal joint 13, including the purchase of material, the forging step, the heat treatment step, the grinding step and the examination step, on the IC tag 4 provided for each of the lot numbers of the elements 2, at each stage of the manufacturing process, and a step of reading the recorded information and then recording portion or the whole of the information so read out on the IC tag 9 attached to the constant velocity universal joint 13. The manufacturing information to be recorded on the IC tag 4 for use during the manufacture includes the processing condition information on at least one of the forging step, the heat treatment step and the grinding step.

Figure 23:
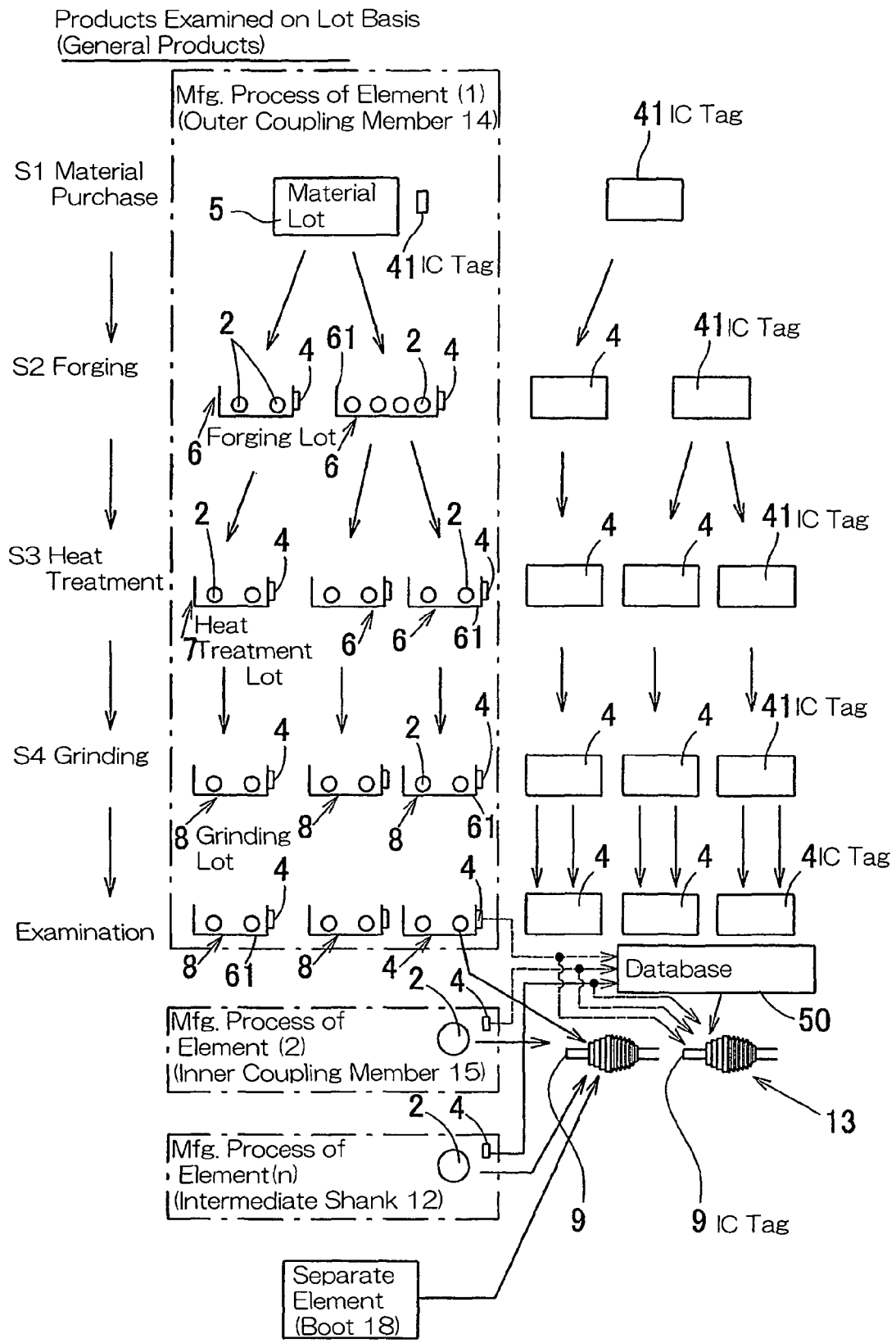
FIG. 23 is an explanatory diagram showing another example of the control of the elements in the quality control method for the constant velocity universal joint.

A method of utilizing the IC tag 4 for use during the manufacture may vary depending on whether the constant velocity universal joint 13 is individually examined such as is the case with the custom-made product or whether the constant velocity universal joint 13 is examined on a lot basis such as is the case with general products. In general, examination on a lot basis is employed. FIG. 22 illustrates the case with the individually examined products (specially ordered products) whereas FIG. 23 illustrates the case with the products examined on the lot basis (general products). Since the individually examined products (specially ordered products) and the product (general products) examined on the lot basis are substantially identical with each other, except that they are different from each other in respect of whether the examination after the grinding step and also after the assemblage is carried out individually or on the lot basis, the individually examined products (specially ordered products) will first be described and, as to the products examined on the lot basis, only the difference from the individually examined products (specially ordered products) will be described subsequently.

The constant velocity universal joint 13 subject to the control by this quality control method is made by assembling different kinds of elements 2 ((1) to (n)) and each of those kinds of the elements 2 is manufactured sequentially through the material purchase step S1, the forging step S2, the heat treatment step S3 and the grinding step S4. The elements 2 manufactured through those steps S1 to S4 include the outer race 14, the inner race 15, the retainer 17 and the intermediate shaft 12.

The constant velocity universal joint 13 may include elements 2 different from the elements 2 that are manufactured through the process including the material purchase step S1 to the grinding step S4 by way of the forging step S2 and the heat treatment step S3. Those different elements 2 include, for example, the boots 18.

The flow from the material purchase step S1 to the grinding step S4 by way of the forging step S2 and the heat treatment step S3 represent broadly divided sections of the flow from purchase of material to completion of the elements 2. Each of those steps may include a plurality of substeps, or may include a step not included within the specific nomenclature. The nomenclatures used to denote the steps S1 to S4 are representative of the divided process steps.

This control method employs the following stages (1) to (4) for each of the elements 2 ((1) to (n)), but employs such stages as will be described later for the constant velocity universal joint 13 made up of the elements 2. It is to be noted that although the number of lots may increase from one manufacturing step to the next manufacturing step on the downstream side of the manufacture, the elements 2 in one lot are not combined with the elements 2 in different lots.

(1) Control Stage During Material Purchase Step (S1)

At the time of purchase of the material for each of the elements 2 the lot number of the material for each of the elements 2 and information concerning the purchased material for each of the elements 2 are recorded on each of the IC tags 4 prepared for each of the material lots 5.

(2) Control Stage During Forging Step (S2)

The IC tags 4 for each of the material lots 5, or new IC tags 4 succeeding the information recorded on the IC tags 4 for each of the material lots 5 are separately prepared for each of forging lots 6, and the forging lot number for the corresponding forging lot 6 and information that can be obtained during the forging step are subsequently recorded on those IC tags 4.

(3) Control Stage During Heat Treatment Step (S3)

The IC tags 4 for each of the forging lots 6, or new IC tags 4 succeeding the information recorded on the IC tags 4 for each of the forging lots 6 are separately prepared for each of heat treatment lots 7, and the heat treatment lot number for the corresponding heat treatment lot 7 and information that can be obtained during the heat treatment step are subsequently recorded in those IC tags 4.

(4) Control Stage During Grinding Step (S4) and Subsequent Examination Step

The IC tags 4 for each of the heat treatment lots 7, or new IC tags 4 succeeding the information recorded on the IC tags 4 for each of heat treatment lots 7 are separately prepared for each of grinding lots 8, and the processing conditions for the grinding lot 8 are recorded on the corresponding IC tag 4. Also, the IC tags 4 for each of the grinding lots 8, or new IC tags 4 succeeding the information recorded on the IC tags 4 for each of the grinding lots 8 are separately prepared for each of the elements 2 or a set of the elements 2 of the same kind, which provides a unit of examination, and the corresponding grinding lot number and information obtained during the examining step are recorded on those IC tags 4.

The IC tag 9, which may be used for the control of the constant velocity universal joint 13 after the completion, is attached to the constant velocity universal joint 13 made up of the elements 2 ((1) to (n)) during a period prior to the assemblage and after the assemblage. Of the manufacturing number unique to the individual constant velocity universal joint 13 and the information recorded on the IC tag 4 after the step of examination of each of the elements 2 ((1) to (n)) used to form the constant velocity universal joint 13, at least the manufacturing number is recorded on the IC tag 9 so attached to the constant velocity universal joint 13. The information recorded on the corresponding IC tag 4 about the manufacturing process of each of the elements 2 ((1) to (n)) used to form the constant velocity universal joint 13 and the information on examination after the completion of the constant velocity universal joint 13 are recorded in the database 50 in correspondence with the manufacturing number of the constant velocity universal joint 13.

The IC tag 4 employed during each of the steps (S1) to (S4) may be identical throughout those steps S1 to S4, or a different IC tag 4 may be employed during each of those steps and the information recorded on the IC tag used during the preceding step may be transcribed on the different IC tag used during the following step. Where the lots separate from each other during a step on the downstream side of the manufacture, a new IC tag 4 may be prepared, on which the information recorded during the preceding step may be transcribed or, alternatively, while the IC tags 4 may be prepared in advance in a number equal to the number of lots that are used throughout the manufacturing process, information can be additionally recorded on the same IC tag 4 throughout the manufacturing process.

Figure 24:
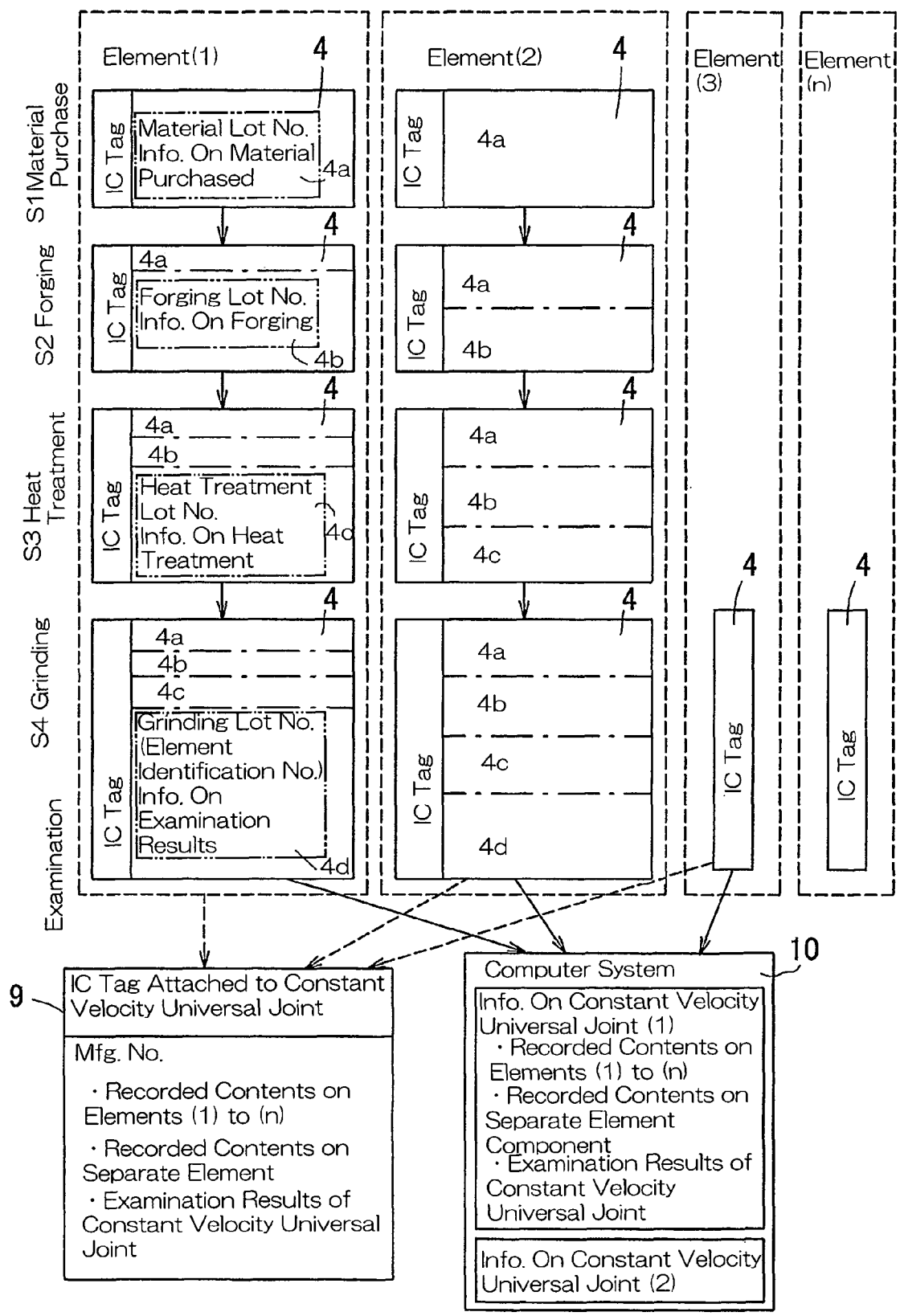
FIG. 24 is an explanatory diagram showing a change in content recorded in the IC tag.
Figure 25:
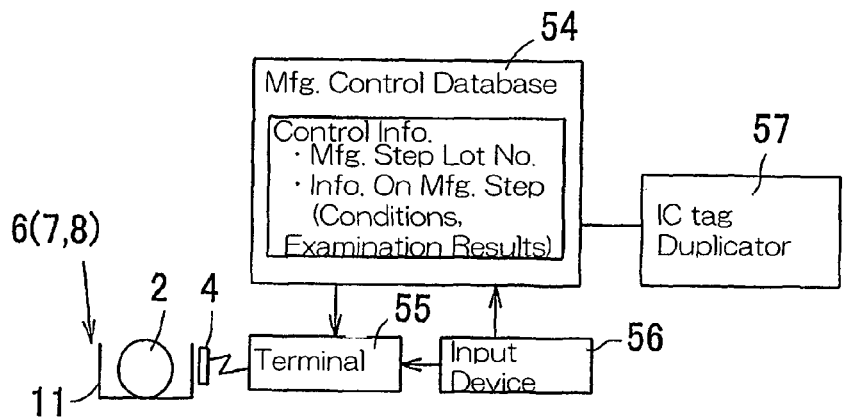
FIG. 25 is an explanatory diagram showing a concept of recording in the IC tag during the manufacture of the elements.

In each of the steps (S1) to (S4), the lot number and the information on the respective manufacturing step (4a) to (4d) both recorded on the IC tag 4 will be supplemented as shown in FIG. 24 for each of those manufacturing steps.

Figure 27:
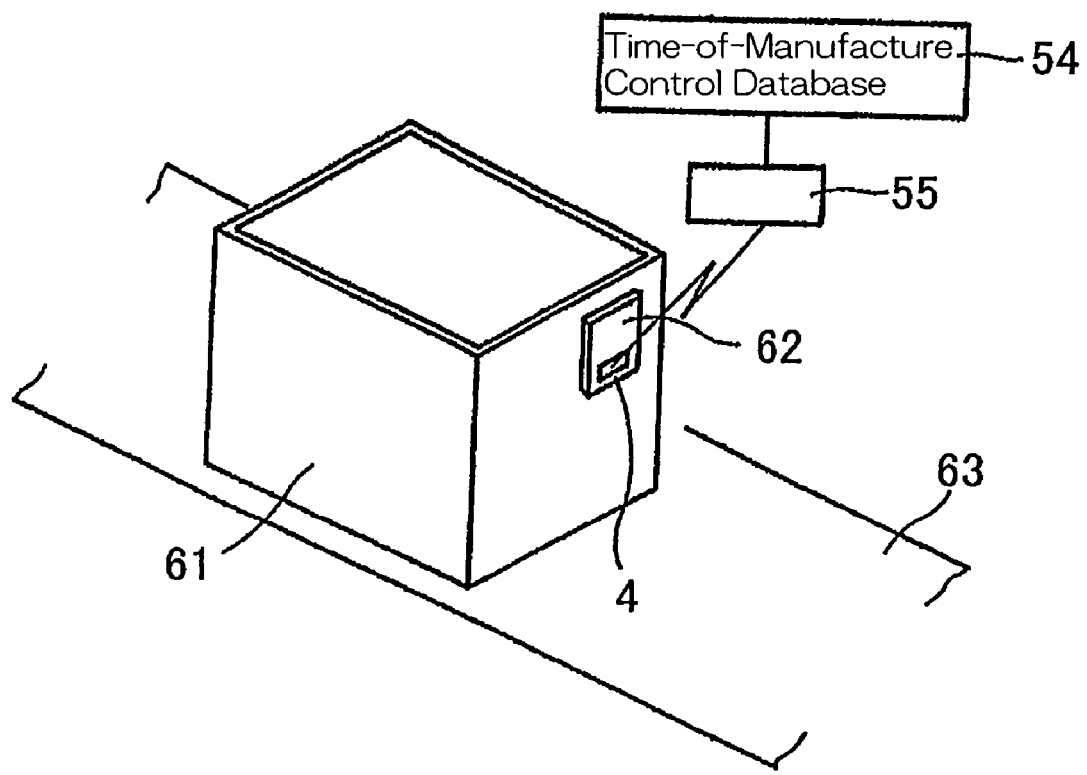
FIG. 27 is an explanatory diagram showing the quality control method according to another preferred embodiment, in which the IC tag is attached to a container.

In each of the steps, the IC tag 4 is attached to, for example, a transport container 61 accommodating therein the elements 2. The container 61 may be, for example, a cage, box or pallet. In such case, the IC tag 4 may be attached directly to the container 61 or may be attached to a visual identifying tag 62 attached to the container 61 as shown in FIG. 27. Attachment of the IC tag 4 to the container 61 may be made removable. When the IC tag 4 is so attached to the container 61, the IC tag 4 prepared for each lot can be moved at all times together with the elements 2 and, therefore, the IC tag 4 can be handled easily. In addition, recording of the information on the IC tag 4 may be carried out along a path of transport path 63 of the elements 2 by means of, for example, a conveyor.

The details of each of the foregoing control stages will now be described.

(1) Control Stage at Material Purchase Step

The material is generally purchased in the form of steel ingots, steel plates, steel tubes, steel wires or the like. The materials so purchased are quality examined, for example, on a lot basis. Information (4a) on the purchased material that is recorded on the IC tag 4 at this control stage can be classified into information on the origin and information on the quality. The origin information is descriptive of the name of a selling company, the place of a factory of such selling company and so on. The quality information is descriptive of the hardness of texture, inclusions of non-metallic material and so on. This quality information is such that although the results of examination of the materials conducted after the purchase of the materials are recorded on the IC tag, the information obtained from the selling company can be recorded, or the both may be recorded. A method of recording the information on the IC tag 4 in this control stage may be carried out by recording the information available from, for example, a purchase control computer (not shown) by means of a recording terminal.

(2) Control Stage at the Forging Step (S2)

The forging step (S2) varies depending on the kind of the constant velocity universal joint 13 and/or the kind of each of the elements 2. As described in connection with, for example, FIG. 10, the forging step (S2) includes a cold forging substep of forming the element 2 in a rough shape, a grinding substep of grinding the roughly forged product and other substeps.

In the case of any of the elements 2, recording of the information (4b) on the IC tag 4 during the forging step (S2) may be carried out either all at a time for the forging step (S2) or during each of the substeps of the forging step (S2). By way of example, where the element 2 is one of the outer race 14, the inner race 15, the retainer 17 and the intermediate shaft 12 and the forging and turning or the turning with no forging is carried out as shown in FIG. 10 or FIG. 12, information on the dimensions of various parts of the elements 2 measured subsequent to the turning is recorded on the IC tag 4. In the case where the element 2 is the balls, information on the dimensions, strains, appearance and others is recorded, for example, subsequent to the stamping and, also, information on the dimensions, sphericity, appearance and others measured after the brushing and also after the green machining is recorded. Processing condition information is also recorded.

The method of recording the information (4b) on the IC tag 4 during this control stage is carried out through a terminal 55 by the time-of-manufacture control database 54, for example, for the process control or the examination control that is used for each step including, for example, the forging step (S2). With respect to the information required to be manually inputted by an operator, it is recorded directly from the terminal 55 or through the time-of-manufacture control database 54 by way of an input device 55 such as a keyboard.

Where the number of the forging lots 6 becomes greater than the number of the material lots 5 in the preceding step, new IC tags 4 are prepared, on which the information (4a) recorded on the IC tags 4 for the material lots 5 is then transcribed with the use of an IC tag duplicator 57, and the information (4b) on the forging step is then recorded on the new IC tags 4 having the information transcribed thereon. Even in each of the subsequent steps, the information is transcribed onto the new IC tags 4 where the number of lots increases in each of the subsequent steps.

(3) Control Stage at Heat Treatment Step (S3)

When the heat treatment is carried out, examination takes place subsequently. In the case where the element 2 is the outer race 14 or the inner race 15, the harness, the deformation, the texture and so on are tested. In the case where the element 2 is the ball 16, the hardness, the texture and so on are tested. Information (4c) on the heat treatment includes results of those tests. Other than this information, heat treatment conditions and others may be recorded.

(4) Control Stage at Grinding Step (S4) and Subsequent Examination Step

The grinding step (S4) may vary depending on the kind of the constant velocity universal joint 13 and the kind of the elements 2 used therein. Where the element 2 is the ball 16, rough grinding, medium grinding, fine grinding, lapping and so on are carried out. In those substeps, articles of manufacture completed are examined after each of those substeps. Information (4d) to be recorded on the IC tag 4 includes processing conditions for each of the substeps during the grinding step (S4). The information (4d) on those processing conditions may include, for example, the kind of a grinding stone, the grinding speed and others. After completion of the grinding step, examination is conducted, results of which are recorded on the IC tag 4. Information (4d) on the results of the examination may include, for example, various dimensions and appearance. Where the element 2 is the ball 16, the information includes the dimensions, sphericity and others contained in results of examination after the rough grinding or any other substeps during the grinding step (S4). The information may further include the appearance, dimensions, sphericity, difference in diameter, hardness, acoustic test results, microscopic test results and others with respect to the elements 2 completed after the grinding step (S4).

During the grinding step (S4), the entire number of the elements 2 are examined when they are the custom-made or specially ordered products. In the case of this 100% examination, the IC tag 4 is prepared in a number equal to the number of the elements 2 and is recorded with such information as the grinding lot number, the individual results of examination and others for the corresponding element 2. In addition to the grinding lot number, the number necessary to identify the individual elements 2 may be additionally recorded in the corresponding IC tag 4. In the case where a number of the elements 2 are employed for each constant velocity universal joint 13 as is the case with the balls 16 or the like, a set of the elements 2 used in each constant velocity universal joint 13 may be considered as a single element 2 and only one IC tag 4 may be prepared for each set of the element 2, with the information recorded thereon for each set.

Control Stage at Assemblage of Constant Velocity Universal Joint 13 and Thereafter The elements 2 so manufactured as hereinbefore described are assembled into the constant velocity universal joint 13 during the assembling step. During a period prior to the assemblage and subsequent to the assemblage, the IC tag 9 is attached to the constant velocity universal joint 13. In other words, the IC tag 9 may be attached either to the elements 2 prior to the assemblage of the constant velocity universal joint 13 or subsequent to the assemblage of the constant velocity universal joint 13.

After completion of the assemblage, the constant velocity universal joint 13 is examined as a complete product. This examination is carried out after, for example, the IC tag 9 has been attached thereto, but may be carried out before the IC tag 9 is attached, depending on how it is attached. Examination of the completed product is carried out on the total number of the constant velocity universal joints 13 where they are a specially ordered product.

Figure 26:
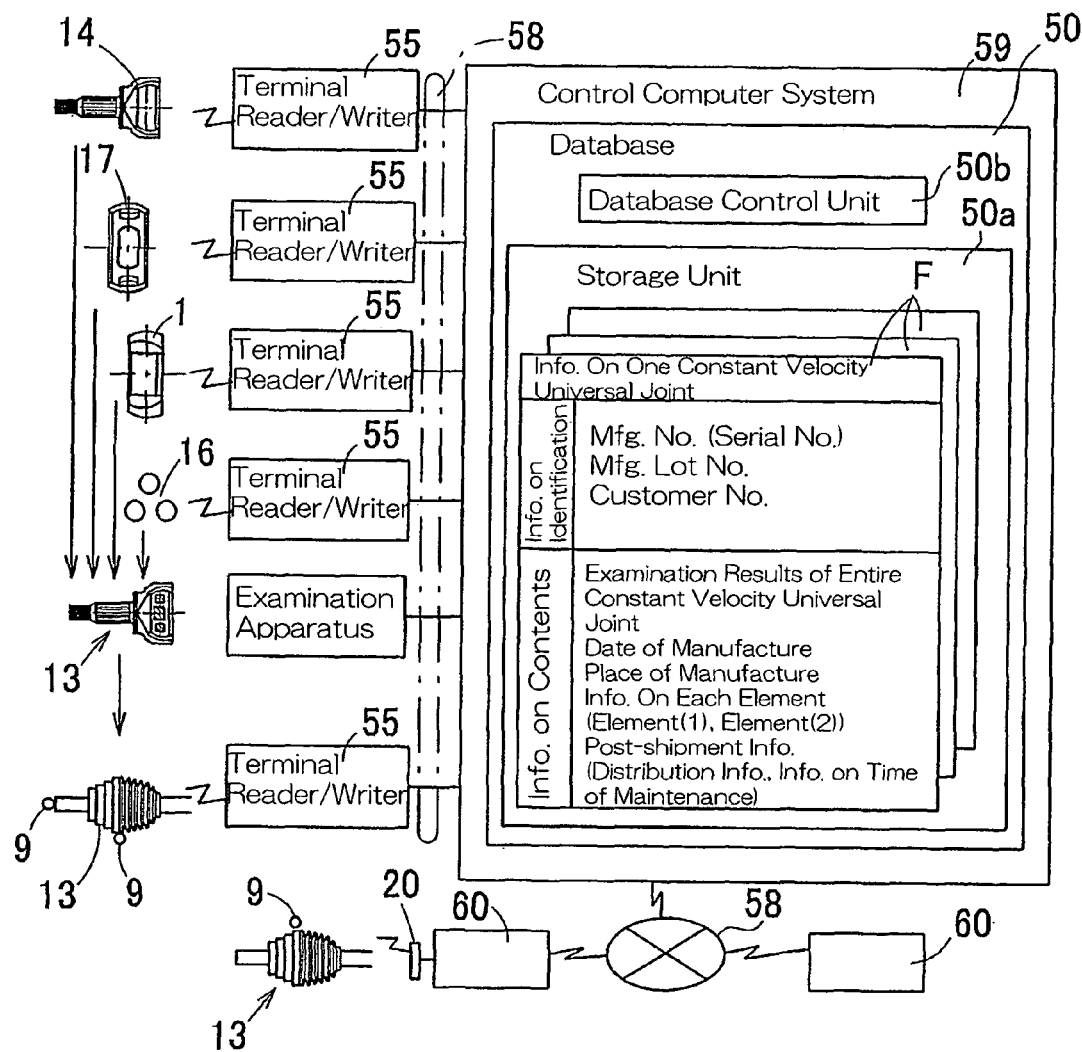
FIG. 26 is an explanatory diagram showing the relation between a database and the IC tag.

During the assemblage of the constant velocity universal joint 13, the information recorded on the IC tag 4 in connection with each of the elements 2 forming respective parts of the constant velocity universal joint 13 is recorded through the database 50 in correspondence with the manufacturing number of the constant velocity universal joint 13 as shown in FIG. 26. Also, even the results of examination on the completed product are recorded in correspondence with the manufacturing number of the constant velocity universal joint. The manufacturing number is a number unique to the individual constant velocity universal joint 13 and is represented by, for example, the serial number. Where the constant velocity universal joint 13 contains a different element (for example, boots 18) 2 which does not pass through the above manufacturing steps, information on this different element 2 is equally recorded in the database 50.

The IC tag 9 attached to the constant velocity universal joint 13 in the manner described above contains at least the manufacturing number. In addition to the manufacturing number, the IC tag 9 may also contain the information recorded on the IC tag 4 in connection with each of the elements 2 and the result of examination of the complete product. Where the result of examination of the completed product is recorded on the IC tag 9 attached to the constant velocity universal joint 13, the results of examination of the completed product are recorded on the IC tag 9 during the examination step and such information may be transcribed from the IC tag 9 onto the database 50. Yet, the IC tag 9 may be attached to not only the constant velocity universal joint 13, but also to a packaging container 70 (FIG. 21) for the constant velocity universal joint 13 and the manufacturing number and others may be recorded on the IC tag 9 attached to the packaging container 70.

The database 50 is provided in a control computer system 59 placed in the environment of a computer network 58 as shown in FIG. 26. The above described information F associated with each of the constant velocity universal joints 13 is recorded on a storage unit 50a of this database 50. The computer network 58 may be a wide area network such as Internet or a combination of the wide area network with a local area network established within the premises of a factory or plant. The database 50 includes the storage unit 50a and a database control unit 50b operable to interface with the storage unit 50a and also to control searches for the information. The database 50 may be any type provided that it can be conceptually recognized as a database for the quality control, or may be an aggregation of physically separate databases, or may be a type capable of commonly sharing the information with any database employed for any other purpose. For example, the database 50 may be an aggregation of a plurality of computers distributed in the computer network 58 or may share the information with the time-of-manufacture control database 54 or a database for the control of technical information.

The database 50 may be connected through the network 58 with various information processing instruments installed within the premises of the factory or plant and/or portable or mobile terminals or information processing instruments 60 installed in technical departments, warehouses, business offices, and/or customer's business offices.

According to the foregoing quality control method, since the information on the history from the material purchase for the elements 2 to results of examination of the completed constant velocity universal joint 13 is stored in the database 50 and the manufacturing number of the constant velocity universal joint 13 is recorded in the IC tag 9 attached to the constant velocity universal joint 13, comparison of the manufacturing number with the database 50 makes it possible to control the relation between the history information and the constant velocity universal joint on one-to-one basis. By way of example, at any arbitrarily chosen time subsequent to the shipment, the user of the constant velocity universal joint 13 or those who conduct maintenance servicing for the constant velocity universal joint 13 can know the history information on the constant velocity universal joint 13. The information generated in each of the manufacturing steps of the elements 2 for the constant velocity universal joint 13 is recorded on the IC tag 4, provided on a lot basis for each of the manufacturing steps, together with the lot number and, therefore, the detailed history information can be controlled.

Since the information for each of the manufacturing steps is recorded on IC tag 4 used for each lot in the respective step, as compared with recording on a check sheet by handwriting, detailed information can be recorded. And since unlike inputting from, for example, the terminal into the computer, it is the IC tag 4 where the information must be inputted, visual recognition of the IC tag 4 is possible, an inputting work is facilitated and an error will hardly occur. Also, since unlike recording in a computer the various and numerous pieces of information on the manufacturing process ranging from the purchase of material to the grinding step with respect to the elements 2, those piece of the information is carried by the IC tag 4 at each step of the manufacturing process, the computer is rather less loaded and the control can be facilitated. For this reason, it is possible to achieve an easy control of the detailed information.

Also, since the manufacturing number of the constant velocity universal joint 13 is recorded on the IC tag 9 attached to such constant velocity universal joint 13, the storage area remaining in this IC tag 9 can be used freely for various applications after the manufacture, for example, shipment control, marketing control, customer control, maintenance control and so on.

Specifically, the constant velocity universal joint 13, where it is used as a constant velocity universal joint for automotive vehicles, is, after having been completely assembled, examined and shipped, generally transported to a warehouse and then delivered to a customer or an automotive vehicle manufacturer through a delivery office as described with reference to FIG. 21. In the case of the specially ordered products, they may be delivered directly to the customer after the shipment thereof. The customer or the automotive vehicle manufacturer will install the constant velocity universal joint 13 into an automotive vehicle and then sell it and, on the other hand, the owner, who purchased the automotive vehicle, uses the constant velocity universal joint 13 consequent on the use of the automotive vehicle and will eventually dispose of it when the lifetime expires or is ready to expire. At every stage, not only can the history information be ascertained by reading the manufacturing number recorded on the IC tag 9 attached to such constant velocity universal joint 13, but also the storage area left unoccupied in the IC tag 9 can be utilized for any purpose.

In the next place, the case in which the constant velocity universal joint 13 is a product to be examined on a lot basis such as experienced with general products will be described with particular reference to FIG. 23. This control of the products to be examined lot-by-lot includes the following control stages (1) to (3) and (4') so long as the elements 2 ((1) to (n)) are concerned, and so long as the constant velocity universal joint 13 assembled with those elements 2 is concerned, the control includes control stages as will be described later. The control stages (1) to (3) from the purchase of material to the heat treatment step previously described in connection with the individually examined products are equally applicable to the lot-by-lot examined products and, therefore, those control stages (1) to (3) will not be reiterated.

(1) Control Stage at Material Purchase Step (S1):
(2) Control Stage at the Forging Step (S2):
(3) Control Stage at the Heat Treatment Step (S3):
(4') Control Stage at Grinding Step (S4) and Subsequent Examination Step At the examination step subsequent to the grinding step (S4), the IC tags 4 for each heat treatment lot 7 or the IC tags 4 each succeeding the information recorded on the corresponding IC tag 4 for each heat treatment lot 7, are prepared for each grinding lot 8. The grinding lot number associated with the grinding lot 8 and information obtained during the examination step are recorded on those IC tags 4. The process taken during the grinding step (S4) is equally applied not only to the lot examined products, but also the individually examined products. While the information recorded during this control level (4') is descriptive of results of examination for each grinding lot 8, the same items to be examined are applied to the lot examined products and also to the individually examined products so long as the elements 2 are concerned, and, accordingly, those results of examination are recorded. Although the items to be examined may be different between the lot examined products and the individually examined products, recording of the results of examination on the IC tags 4 should be made regardless of the difference in item to be examined.

Assemblage of Constant Velocity Universal Joint 13 and Subsequent Control Stage The IC tags 9 are attached to the constant velocity universal joints 13 each assembled with the elements 2 during a period prior to the assemblage and subsequent to the assemblage. Of the manufacturing lot number and the information recorded on the IC tags 4 after the step of examination of each of the elements 2 ((1) to (n)) employed to form the respective constant velocity universal joint 13, at least the manufacturing lot number is recorded in each of those IC tags 9 attached to the respective constant velocity universal joint 13. Also, the information recorded on each of the IC tags 4 about the manufacturing steps S1 to S4 with respect to the elements 2 ((1) to (n)) used to form the respective constant velocity universal joint 13 and the information on examination of the constant velocity universal joint 13 after the completion of the latter are recorded in the database 50 in correspondence with the manufacturing lot number.

It is to be noted that the control of the lot examined products is substantially similar to the control of the individually examined products, unless otherwise specified.

Since this control method controls the constant velocity universal joint 13 on the manufacturing lot basis, it will not provide a one-to-one control between the constant velocity universal joint 13 and the history information. However, effects and advantages similar to those obtained by the previously described first quality control method for the individually examined products of the constant velocity universal joint 13 can be obtained by this control method. Comparison to the control computer system 10 is made using the lot number obtained from the IC tags 9 attached to the respective constant velocity universal joint 13.

It is to be noted that although in describing any one of the foregoing embodiments, reference has been made mainly to the constant velocity universal joint that is used on the vehicle drive shaft 11, the present invention can be equally applied to the constant velocity universal joint that is used on a vehicle propeller shaft.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A constant velocity universal joint comprising:
   an IC tag capable of a contactless communication;
   an outer race;
   an inner race;
   rolling elements interposed between the outer race and the inner race for transmitting a rotation therebetween; and
   a shaft member coupled with the inner race,
   wherein the IC tag capable of the contactless communication is attached to the shaft member, and
   wherein the shaft member has opposite ends adapted to be coupled with respective constant velocity universal joints, wherein an intermediate portion of the shaft member, which lies between respective sites, at which boots for the constant velocity universal joints are fixed, has a diameter greater than that of shaft end portions, which lie on the respective sides of those sites, wherein a mounting groove is provided in an outer periphery of this intermediate portion of the shaft member, and wherein the IC tag is attached within this mounting groove.

2. The constant velocity universal joint as claimed in claim 1, wherein the IC tag is recorded with identification information for identifying the constant velocity universal joint and manufacturing information on the constant velocity universal joint.

3. The constant velocity universal joint as claimed in claim 1, wherein the IC tag is connected to a sensor for detecting an object to be detected of the constant velocity universal joint.

4. An automotive vehicle drive shaft, which comprises:
a shaft member; and
a pair of constant velocity universal joints having inner races coupled respectively with opposite ends of the shaft member,
wherein one or both of the constant velocity universal joints comprises:
an IC tag capable of a contactless communication;
an outer race;
an inner race;
rolling elements interposed between the outer race and the inner race for transmitting a rotation therebetween; and
a shaft member coupled with the inner race,
wherein the IC tag capable of the contactless communication is attached to the shaft member.

5. The automotive vehicle drive shaft as claimed in claim 4, further comprising an IC tag attached to each of the constant velocity universal joints and wherein one of the IC tags is recorded with identification information necessary to identify the automotive vehicle drive shaft.

6. A quality control method for a constant velocity universal joint for controlling the constant velocity universal joint as recited in claim 1, comprising:
attaching the IC tag to the constant velocity universal joint; and
recording information on a quality control of the constant velocity universal joint or information on a status-of-use of the constant velocity universal joint in the IC tag.

7. The quality control method for the constant velocity universal joint as claimed in claim 6, further comprising:
a utilizing step of reading, at any arbitrarily chosen time subsequent to shipment, the information recorded in the IC tag and confirming a predetermined information from the information read out therefrom.

8. The quality control method for the constant velocity universal joint as claimed in claim 7,
wherein the constant velocity universal joint is utilized in an automotive vehicle;
wherein the reading of the IC tag during the utilizing step is carried out by the utilization of a tag reader while the constant velocity universal joint remains incorporated in the automotive vehicle; and
wherein information on the constant velocity universal joint is made available by means of an information processor connected wired or wireless to the tag reader or an information processor integrated with the tag reader.

9. The quality control method for the constant velocity universal joint as claimed in claim 6, which comprises:
a step of attaching an IC tag to one of a plurality of elements which form respective parts of the constant velocity universal joint;
a step of recording information on a manufacturing process of the constant velocity universal in the IC tag attached to the constant velocity universal joint; and
a step of reading, at any arbitrarily chosen time subsequent to shipment, the information recorded in the IC tag and confirming a predetermined information from the information read out therefrom.

10. The quality control method for the constant velocity universal joint as claimed in claim 6, which comprises:
a step of preparing a database for storing a predetermined manufacturing information on the constant velocity universal joint in association with an identification information on the constant velocity universal joint, contents of which can be extracted by the identification information;
a step of attaching an IC tag to one of a plurality of elements forming respective parts of the constant velocity universal joint;
a step of recording, in accordance with the database at a time of shipment or by a time of delivery to a customer, an identification information on the constant velocity universal joint in the IC tag and also recording information on a manufacturing process of the constant velocity universal joint; and
an information reading and utilizing step of reading, at any arbitrarily chosen time subsequent to shipment, the information recorded in the IC tag and confirming the information on the manufacturing process of the constant velocity universal joint by comparing the information read out with the database.

11. The quality control method for the constant velocity universal joint as claimed in claim 6, which comprises:
a step of preparing a database for storing a predetermined manufacturing information on the constant velocity universal joint, contents of which can be extracted therefrom;
a step of attaching an IC tag to one of a plurality of elements forming respective parts of the constant velocity universal joint;
a step of recording in the IC tag attached to the constant velocity universal joint a predetermined shipment information on the constant velocity universal joint in accordance with the database; and
a step of reading, at any arbitrarily chosen time subsequent to shipment, the information recorded in the IC tag and confirming the information on the constant velocity universal joint from the information read out from the IC tag or information obtained by comparing the read-out information with the database.

12. The quality control method for the constant velocity universal joint as claimed in claim 11, wherein the predetermined shipment information on the constant velocity universal joint, which is written in the IC tag, includes an identification information on the constant velocity universal joint and wherein the database stores a predetermined manufacturing information on the constant velocity universal joint in association with the identification information on the constant velocity universal joint, stored contents of which can be extracted by the identification information.

13. The quality control method for the constant velocity universal joint as claimed in claim 11, wherein the predetermined shipment information on the constant velocity universal joint, which is written in the IC tag, includes information on a date of manufacture of the constant velocity universal joint.

14. The quality control method for the constant velocity universal joint as claimed in claim 11, wherein the predetermined shipment information on the constant velocity universal joint, which is written in the IC tag, includes information on a place of manufacture of the constant velocity universal joint.

15. The quality control method for the constant velocity universal joint as claimed in claim 6, which method is for controlling the constant velocity universal joint by recording in the IC tag, a predetermined manufacturing information concerning a process flow ranging from a step of material purchase associated with the constant velocity universal joint to a step of examination by way of a step of at least one of forging and turning, a heat treatment step and a grinding step and comprises:

a step of attaching the IC tag to one of elements forming respective parts of the constant velocity universal joint during a manufacture of the constant velocity universal joint or at a time of completion of manufacture thereof;

a step of recording in the IC tag, attached to the constant velocity universal joint, at a time of shipment or by a time of delivery to a customer at least one of processing condition information on at least one of the manufacturing steps for the constant velocity universal joint, and material information on at least one of the elements; and an information reading and utilizing step of reading the information recorded in the IC tag and confirming the at least one of the processing condition information and the material information from the information read out from the IC tag at an arbitrary time subsequent to shipment.

16. The quality control method for the constant velocity universal joint as claimed in claim 6, which comprises:

a step of preparing a database for storing, in association with an identification information on the constant velocity universal joint, a predetermined manufacturing information concerning a process flow ranging from a step of material purchase to a step of examination by way of a step of at least one of forging and turning, a heat treatment step and a grinding step, all steps associated with the constant velocity universal joint, stored contents of which can be extracted by the identification information;

a step of attaching the IC tag to one of elements forming respective parts of the constant velocity universal joint during a manufacture of the constant velocity universal joint or at a time of completion of manufacture thereof;

a step of recording in the IC tag, attached to the constant velocity universal joint, at a time of shipment or by a time of delivery to a customer an identification information on the constant velocity universal joint and also recording at least one of processing condition information on at least one of the manufacturing steps for the constant velocity universal joint, and material information on at least one of the elements, in accordance with the database; and an information reading and utilizing step of reading the information recorded in the IC tag at an arbitrarily chosen time subsequent to shipment and conducting from the information read out from the IC tag or information obtained by comparing the information read out from the IC tag with the database, one of a confirmation of purchased material, a confirmation of the manufacturing process, a confirmation of at least one of the processing condition information and the material information, and a confirmation of results of examination.

17. The quality control method for the constant velocity universal joint as claimed in claim 6, which comprises:

a step of preparing a database for storing, in association with an identification information on the constant velocity universal joint, a predetermined manufacturing information on a process flow ranging from a step of material purchase to a step of examination by way of a step of at least one of forging and turning, a heat treatment step and a grinding step, all steps associated with the constant velocity universal joint, stored contents of which can be extracted by the identification information;

a step of attaching the IC tag to one of elements forming respective parts of the constant velocity universal joint during a manufacture of the constant velocity universal joint or at a time of completion of manufacture thereof;

a step of recording in the IC tag, attached to the constant velocity universal joint, an identification information on the constant velocity universal joint and also recording at least one of pieces of information including a date of manufacture, a place of manufacture, a brand of a filled grease, a gap between the neighboring elements, a term of warranty and handing cautions, all associated with the constant velocity universal joint, in accordance with the database at a time of shipment or by a time of delivery to a customer; and an information reading and utilizing step of reading the information recorded in the IC tag at an arbitrarily chosen time subsequent to shipment and conducting from the information read out from the IC tag or information obtained by comparing the information read out from the IC tag with the database, one of a confirmation of purchased material, a confirmation of the manufacturing process, a confirmation of at least one of the processing condition information and the material information, and a confirmation of results of examination.

18. The quality control method for the constant velocity universal joint as claimed in claim 6, which comprises a step of recording in the IC tag for the manufacturing process, which is prepared for each of lot numbers of elements forming respective parts of the constant velocity universal joint, a predetermined manufacturing information on a process flow ranging from a step of material purchase to a grinding step by way of a step of at least one of forging and turning and a heat treatment step, all steps associated with each of the elements, for each process step, and a step of reading this recorded manufacturing information and recording portion or whole of the manufacturing information so read out in the IC tag attached to the constant velocity universal joint, and wherein the manufacturing information recorded in the IC tag for the manufacturing process includes at least one of a processing condition information, associated with at least one of the manufacturing steps, and a material information on the materials used for the elements.

19. The quality control method for the constant velocity universal joint as claimed in claim 6, further comprising a step of recording a predetermined manufacturing information on a process flow ranging from a step of material purchase of elements forming respective parts of the constant velocity universal joint to an examination step by way of a step of at least one of forging and turning, a heat treatment step and a grinding step, all steps associated with each of the elements, for each process step, in a time-of-manufacture database in association with a lot number of the elements or an identification number for each of the elements, and a step of recording this recorded information in the IC tag attached to the constant velocity universal joint.

20. The quality control method for the constant velocity universal joint as claimed in claim 6, wherein the constant velocity universal joint includes as an element an outer race, an inner race and rolling elements interposed between the outer and inner races, wherein the IC tag is prepared for each lot of manufacturing steps ranging from material receipt to completion and then to completion of an examination with respect to each of the elements forming respective parts of the constant velocity universal joint, wherein the IC tag prepared for each lot of the manufacturing steps is rendered to be the same IC tag used for the corresponding lot in a preceding manufacturing step on the upstream side of the manufacture or an IC tag succeeding the information on the IC tag used for the corresponding lot in the preceding manufacturing step on the upstream side of the manufacture, and wherein a lot number in each of the manufacturing steps and information on each manufacturing step are recorded in the IC tag prepared for each lot of that step.

21. The quality control method for the constant velocity universal joint as claimed in claim 6, which joint is assembled with a plurality of kinds of elements, which are manufactured through a manufacturing process ranging from purchase of material to a grinding step by way of a forging step including at least one of forging and turning, and a heat treatment step, and is individually examined, which method comprises, with respect to each of the elements:

a step of recording in an IC tag, prepared for each material lot, information on a material lot number of the corresponding material lot and material received, at a time of purchase of the material for each of the elements;

a step of preparing, during the forging step, for each forging lot, the same IC tag used for each material lot or a different IC tag succeeding the information recorded in the IC tag used for each material lot, and recording in those IC tags a forging lot number of the corresponding forging lot and information obtained during the forging step;

a step of preparing, during the heat treatment step, for each heat treatment lot, the same IC tag used for each forging lot or a different IC tag succeeding the information recorded in the IC tag used for each forging lot, and recording in those IC tags the heat treatment lot number of the corresponding heat treatment lot and information obtained during the heat treatment step;

a step of preparing, during the examination step subsequent to the grinding step, for each element or each set of the elements of the same kind, which form a unit for examination, the same IC tag used for each heat treatment lot or a different IC tag succeeding the information recorded in the IC tag used for each heat treatment lot, and recording in those IC tags a grinding lot number of the corresponding grinding lot and information obtained during the examination step; and further comprises:

a step of attaching the IC tag during a period prior to assemblage and after the assemblage to each of the constant velocity universal joints each assembled with the elements, recording in the IC tag, attached to the respective constant velocity universal joint, at least a manufacturing number specific to the individual constant velocity universal joint out of the manufacturing number specific to the individual constant velocity universal joint and information recorded in the IC tag during the manufacturing steps for each of the elements used in the constant velocity universal joint, and recording in the database information recorded in the IC tag during the manufacturing steps for each of the elements used in the constant velocity universal joints and information on the examination on the completed constant velocity universal joint in correspondence with the manufacturing number of the constant velocity universal joint.

22. The quality control method for the constant velocity universal joint as claimed in claim 6, which joint is assembled with a plurality of kinds of elements, which are manufactured through a manufacturing process ranging from purchase of material to a grinding step by way of a grinding step including at least one of forging and turning, and a heat treatment step, and is examined on a lot basis for each lot, which method comprises, with respect to each of the elements:

a step of recording in an IC tag, prepared for each material lot, information on a material lot number of the corresponding material lot and material received, at a time of purchase of the material for each of the elements;

a step of preparing, during the forging step, for each forging lot, the same IC tag used for each material lot or a different IC tag succeeding the information recorded in the IC tag used for each material lot, and recording in those IC tags a forging number of the corresponding forging lot and information obtained during the forging step;

a step of preparing, during the heat treatment step, for each heat treatment lot, the same IC tag used for each forging lot or a different IC tag succeeding the information recorded in the IC tag used for each forging lot, and recording in those IC tags a heat treatment lot number of the corresponding heat treatment lot and information obtained during the heat treatment step;

a step of preparing, during the examination step subsequent to the grinding step, for each grinding step, the same IC tag used for each heat treatment lot or a different IC tag succeeding the information recorded in the IC tag used for each heat treatment lot, and recording in those IC tags a grinding lot number of the corresponding grinding lot and information obtained during the examination step; and further comprises:

attaching the IC tag to each of the constant velocity universal joints, assembled with the elements, during a period prior to assemblage and after the assemblage;

recording in the IC tag, attached to the respective constant velocity universal joint, at least a manufacturing lot number out of the manufacturing lot number and information recorded in the IC tag during the manufacturing steps for each of the elements used in the constant velocity universal joint, and recording in the database information recorded in the IC tag during the manufacturing steps for each of the elements used in the constant velocity universal joint and information on the examination of the completed constant velocity universal joint in correspondence with the manufacturing lot number.

23. The quality control method for the constant velocity universal joint as claimed in claim 20, wherein the IC tag prepared for each lot of the manufacturing steps is attached to a container containing the material used in the same lot or the elements of the same lot.

24. The quality control method for the constant velocity universal joint as claimed in claim 6, wherein the constant velocity universal joint has a grease filled therein during assemblage thereof and the IC tag attached to the constant velocity universal joint is recorded with a date of assemblage of the constant velocity universal joint.

25. The quality control method for the constant velocity universal joint as claimed in claim 6, wherein the IC tag attached to the constant velocity universal joint is recorded with information concerning whereabouts of the constant velocity universal joint from shipment of the constant velocity universal joint to delivery thereof to a customer.

26. The quality control method for the constant velocity universal joint as claimed in claim 6, wherein the status-of-use recorded in the IC tag includes at least one of a total number of revolutions, a maximum number of revolutions, a temperature and a torque.

27. The quality control method for the constant velocity universal joint as claimed in claim 6, wherein the constant velocity universal joint forms a part of an automotive vehicle drive shaft, wherein a reader/writer capable of communicating with the IC tag and a write-in processor for writing a predetermined information in the IC tag through the reader/ writer are mounted on an automotive vehicle, and wherein the status-of-use is recorded in the IC tag through this write-in processor.

28. The quality control method for the constant velocity universal joint as claimed in claim 27, wherein the write-in processor has a function of regularly recording the status-of-use.

29. The quality control method for the constant velocity universal joint as claimed in claim 27, wherein the write-in processor records, as the status-of-use information, one or both of a travel distance and a maximum speed and wherein recording of one or both of the travel distance and the maximum speed is carried out by updating contents recorded in the IC tag.

30. The quality control method for the constant velocity universal joint as claimed in claim 6, wherein a sensor for detecting an object to be detected of the constant velocity universal joint is connected with the IC tag and wherein as the status-of-use information, detected information of this sensor is recorded in the IC tag.

* * * * *